(12) United States Patent
Koyanagi et al.

(10) Patent No.: US 11,979,531 B2
(45) Date of Patent: May 7, 2024

(54) IMAGE READING APPARATUS INCLUDING AN APPARATUS MAIN BODY AND A SWITCHING MECHANISM FOR SWITCHING POSTURE OF THE APPARATUS MAIN BODY BY IMPARTING A DRIVE FORCE

(71) Applicant: SEIKO EPSON CORPORATION, Tokyo (JP)

(72) Inventors: Noriyuki Koyanagi, Kitakyushu (JP); Keiichiro Fukumasu, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/937,095

(22) Filed: Sep. 30, 2022

(65) Prior Publication Data

US 2023/0102040 A1    Mar. 30, 2023

(51) Int. Cl.
*H04N 1/00* (2006.01)
*H04N 1/12* (2006.01)

(52) U.S. Cl.
CPC ......... *H04N 1/00562* (2013.01); *H04N 1/123* (2013.01); *H04N 1/00551* (2013.01); *H04N 2201/0081* (2013.01); *H04N 2201/0464* (2013.01)

(58) Field of Classification Search
CPC .......... H04N 1/00551; H04N 1/00562; H04N 1/123; H04N 2201/0081; H04N 2201/0464

USPC ........................................................ 358/474
See application file for complete search history.

(56) References Cited

U.S. PATENT DOCUMENTS

| 2007/0188818 | A1  | 8/2007  | Westcott et al. |
| 2014/0079460 | A1* | 3/2014  | Kanaya ................ B65H 3/0653 400/583 |
| 2018/0376021 | A1* | 12/2018 | Koyanagi .......... H04N 1/00716 |
| 2019/0253564 | A1* | 8/2019  | Koyanagi .......... H04N 1/00588 |
| 2021/0120135 | A1* | 4/2021  | Mokuo .............. H04N 1/00535 |
| 2023/0102828 | A1* | 3/2023  | Koyanagi .......... H04N 1/00615 358/474 |

FOREIGN PATENT DOCUMENTS

JP        2009527143 A      7/2009

* cited by examiner

*Primary Examiner* — Chad Dickerson
(74) *Attorney, Agent, or Firm* — CHIP LAW GROUP

(57) ABSTRACT

A scanner includes an apparatus main body, a stand, and a switching mechanism. The apparatus main body includes a transport unit that transports a document along a transport path, and a reading unit that reads an image of the document. The stand supports the apparatus main body. The switching mechanism switches the posture of the apparatus main body with respect to the stand so that the transport path extends along an intersecting direction intersecting an installation surface. The switching mechanism includes a switching motor that imparts a driving force to the apparatus main body when switching the posture. The switching motor is located inside the apparatus main body on the lower side of the transport path in the vertical direction.

11 Claims, 18 Drawing Sheets

IMAGE READING APPARATUS INCLUDING AN APPARATUS MAIN BODY AND A SWITCHING MECHANISM FOR SWITCHING POSTURE OF THE APPARATUS MAIN BODY BY IMPARTING A DRIVE FORCE

The present application is based on, and claims priority from JP Application Serial Number 2021-160576, filed Sep. 30, 2021, the disclosure of which is hereby incorporated by reference herein in its entirety.

BACKGROUND

1. Technical Field

The present disclosure relates to an image reading apparatus.

2. Related Art

A document imaging apparatus disclosed in JP-T-2009-527143 includes an imaging apparatus main body provided with an image data conversion device and a paper feed device. In order to adjust an inclination angle of the imaging apparatus main body to one of a plurality of inclination angle positions, the imaging apparatus main body is pivotably coupled to a support. Further, the imaging apparatus main body is locked in an inclined position by a latching mechanism.

In the document imaging apparatus disclosed in JP-T-2009-527143, the latching mechanism for locking the apparatus main body is located on the outer side in the width direction of the apparatus main body, and thus the size of the apparatus is increased. In this way, there is a risk that the footprint of the image reading apparatus provided with the apparatus main body capable of switching the posture may become large.

SUMMARY

In order to solve the problem described above, an image reading apparatus according to an aspect of the present disclosure includes an apparatus main body including a transport unit configured to transport a document along a transport path and a reading unit facing the transport path and configured to read an image on the document, a support portion configured to support the apparatus main body, and a switching mechanism configured to switch posture of the apparatus main body to at least two postures with respect to the support portion. The switching mechanism includes a switching drive source configured to impart a driving force to the apparatus main body when switching the posture, and the switching drive source is located on a lower side of the transport path in a vertical direction inside the apparatus main body.

DESCRIPTION OF EXEMPLARY EMBODIMENTS

Figure 1:
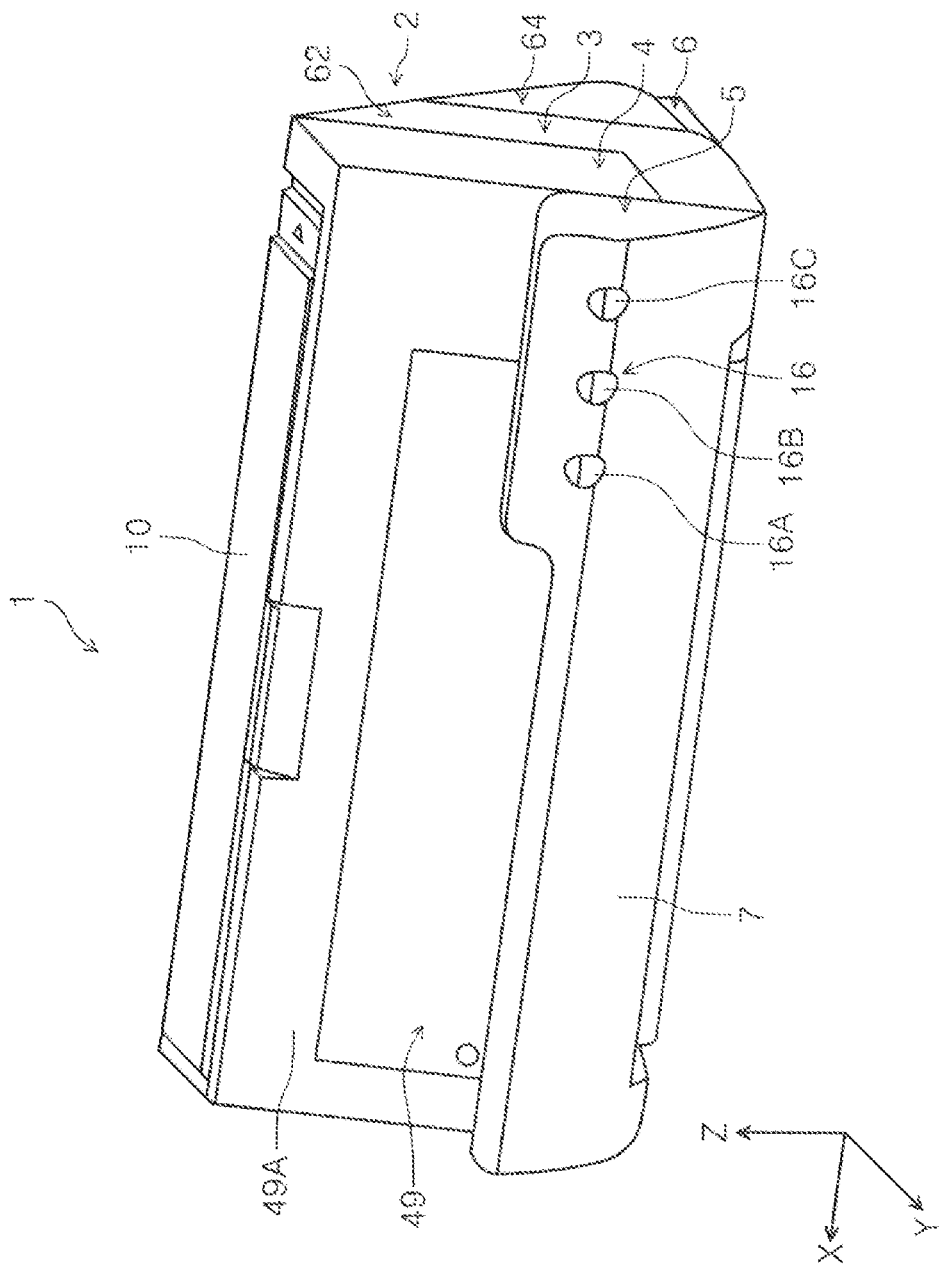
FIG. 1 is a perspective view, as viewed from the front, of a scanner in which an apparatus main body is in a normal reading posture.

The present disclosure will be schematically described below.

An image reading apparatus according to a first aspect includes an apparatus main body including a transport unit configured to transport a document along a transport path and a reading unit facing the transport path and configured to read an image on the document, a support portion configured to support the apparatus main body, and a switching mechanism configured to switch posture of the apparatus main body to at least two postures with respect to the support portion to cause the transport path to follow an intersecting direction intersecting a horizontal plane. The switching mechanism includes a switching drive source configured to impart a driving force to the apparatus main body when switching the posture, and the switching drive source is located on a lower side of the transport path in a vertical direction inside the apparatus main body.

According to this aspect, when the transport path extends along the intersecting direction, the width in the horizontal direction of a space occupied by the image reading apparatus is caused to be narrower that that obtained when the transport path extends along the horizontal plane. When the transport path extends along the intersecting direction, the switching drive source is located on the lower side of the transport path in the vertical direction inside the apparatus main body.

In other words, in a state in which the width in the horizontal direction of the space occupied by the image reading apparatus is narrow, the switching drive source is disposed in a free region inside the apparatus main body on the lower side of the transport path in the vertical direction. Thus, the footprint of the image reading apparatus can be reduced.

With respect to the first aspect, in an image reading apparatus according to a second aspect, the switching drive source includes a rotary shaft, and an imaginary line obtained by extending a center line of the rotary shaft intersects with an installation surface on which the support portion is installed.

According to this aspect, the rotary shaft is disposed so as to include a component of the vertical direction, and thus the switching drive source is brought into a state of standing up with respect to the installation surface. Thus, the footprint of the image reading apparatus can be reduced.

With respect to the first or second aspect, in an image reading apparatus according to a third aspect, the transport path includes a reading path facing the reading unit, and the switching mechanism overlaps with a portion of the reading path when viewed from a facing direction in which the reading unit and the reading path face each other.

According to this aspect, the switching mechanism overlaps with a portion of the reading path, and thus the footprint of the image reading apparatus can be reduced compared to a configuration in which the switching mechanism does not overlap with the portion of the reading path.

With respect to any one of the first to third aspects, in an image reading apparatus according to a fourth aspect, the transport unit includes a transport member configured to transport the document, a guide member configured to guide the document, and a transport drive source configured to rotationally drive the transport member, and at least a portion of the transport drive source overlaps with at least a portion of the guide member in an apparatus height direction intersecting a transport direction of the document.

According to this aspect, the guide member for guiding the document and the transport drive source is not required to be disposed offset from each other in the apparatus height direction, and thus the apparatus height of the image reading apparatus can be reduced.

With respect to the fourth aspect, in an image reading apparatus according to a fifth aspect, at least a portion of the transport drive source overlaps with a portion of the guide member in an apparatus width direction intersecting the transport direction.

According to this aspect, the guide member for guiding the document and the transport drive source is not required to be disposed offset from each other in the apparatus width direction, and thus the footprint of the image reading apparatus can be reduced.

With respect to the fourth or fifth aspect, in an image reading apparatus according to a sixth aspect, the transport drive source overlaps with a portion of the reading unit in both the apparatus height direction, and the apparatus width direction intersecting the transport direction.

According to this aspect, the transport drive source overlaps with the portion of the reading unit in the two directions, and thus the footprint of the image reading apparatus can be reduced.

With respect to the sixth aspect, in an image reading apparatus according to a seventh aspect, in at least one of the postures, at least a portion of the transport drive source is located above the reading unit in the vertical direction.

According to this aspect, heat generated during an operation of the transport drive source travels upward in the vertical direction. As a result, the heat of the transport drive source is less likely to be transferred to the reading unit, and thus the reading unit is less likely to be distorted. Therefore, a deterioration in the reading accuracy of the document can be suppressed.

With respect to the sixth or seventh aspect, in an image reading apparatus according to an eighth aspect, the reading unit includes a light source unit configured to irradiate the document with light, and at least a portion of the transport drive source overlaps with the light source unit in the apparatus width direction.

According to this aspect, the portion of the transport drive source overlaps with the light source unit, and thus the footprint of the image reading apparatus can be reduced.

With respect to the fourth or eighth aspect, in an image reading apparatus according to a ninth aspect, the apparatus main body includes a placement portion at which the document before being transported is placed, and an edge guide provided at the placement portion and configured to move in an apparatus width direction intersecting the transport direction of the document and to align an end portion in the apparatus width direction of the document, and a portion of the transport drive source overlaps with a portion of a movable region of the edge guide in the apparatus width direction.

According to this aspect, the portion of the transport drive source overlaps with the portion of the movable region of the edge guide in the apparatus width direction, and thus the footprint of the image reading apparatus can be reduced.

With respect to any one of the first to ninth aspects, in an image reading apparatus according to a tenth aspect, the apparatus main body includes a first cover member constituting a side portion of the apparatus main body in an apparatus width direction intersecting a transport direction of the document, and a second cover member constituting a side portion of the apparatus main body at a back surface side of the apparatus main body and being further away from a placement portion at which the document is placed than the first cover member, and a second length in the apparatus width direction of the second cover member is shorter than a first length in the apparatus width direction of the first cover member.

According to this aspect, in the apparatus width direction, the width of the second cover member on the back surface side is narrower than the width of the first cover member located further to the front surface side than the second cover member, and thus the second cover member on the back surface side is hidden when viewed from the front surface side. As a result, the design of the image reading apparatus when viewed from the front surface side is improved.

With respect to the tenth aspect, in an image reading apparatus according to an eleventh aspect, the second cover member overlaps with the switching drive source in the apparatus width direction.

According to this aspect, a portion of the apparatus main body in which the switching drive source is housed is disposed at a position that is not visible from the front surface side, and thus a deterioration in the design of the image reading apparatus when viewed from the front surface side can be suppressed.

An embodiment of the present disclosure will be specifically described below.

As illustrated in FIG. 1, a scanner 1, which is an example of an image reading apparatus, will be described. In FIG. 1, the scanner 1 is in a normal reading posture described below.

The scanner 1 is a so-called sheet feed type scanner that performs reading of a document G (FIG. 3) while moving the document G with respect to a reading unit 40 (FIG. 3) described below. In this specification, the document G includes not only a sheet, but also a card-like or booklet-like document. The scanner 1 includes an apparatus main body 2 and a stand 6.

The apparatus main body 2 includes a first unit 3, a second unit 4, and a third unit 5.

Note that in an X-Y-Z coordinate system illustrated in each of the drawings, an X-axis direction is an example of the apparatus width direction, the width direction of the document G, and the horizontal direction. A Y-axis direction is the apparatus depth direction. A Z-axis direction is an example of the vertical direction and the apparatus height direction. The Z-axis direction intersects with an A-axis direction described below.

In this embodiment, a positive Y direction is a direction from the back surface of the apparatus toward the front surface thereof, and a negative Y direction is a direction from the front surface of the apparatus toward the back surface thereof. In other words, with respect to the center of the scanner 1, the positive Y direction is the front surface side, and the negative Y direction is the back surface side. Further, as viewed from the front surface of the apparatus, the left direction is referred to as a positive X direction, and the right direction is referred to as a negative X direction. Furthermore, the upward direction in the Z-axis direction is referred to as a positive Z direction, and the downward direction in the Z-axis direction is referred to as a negative Z direction.

Figure 2:
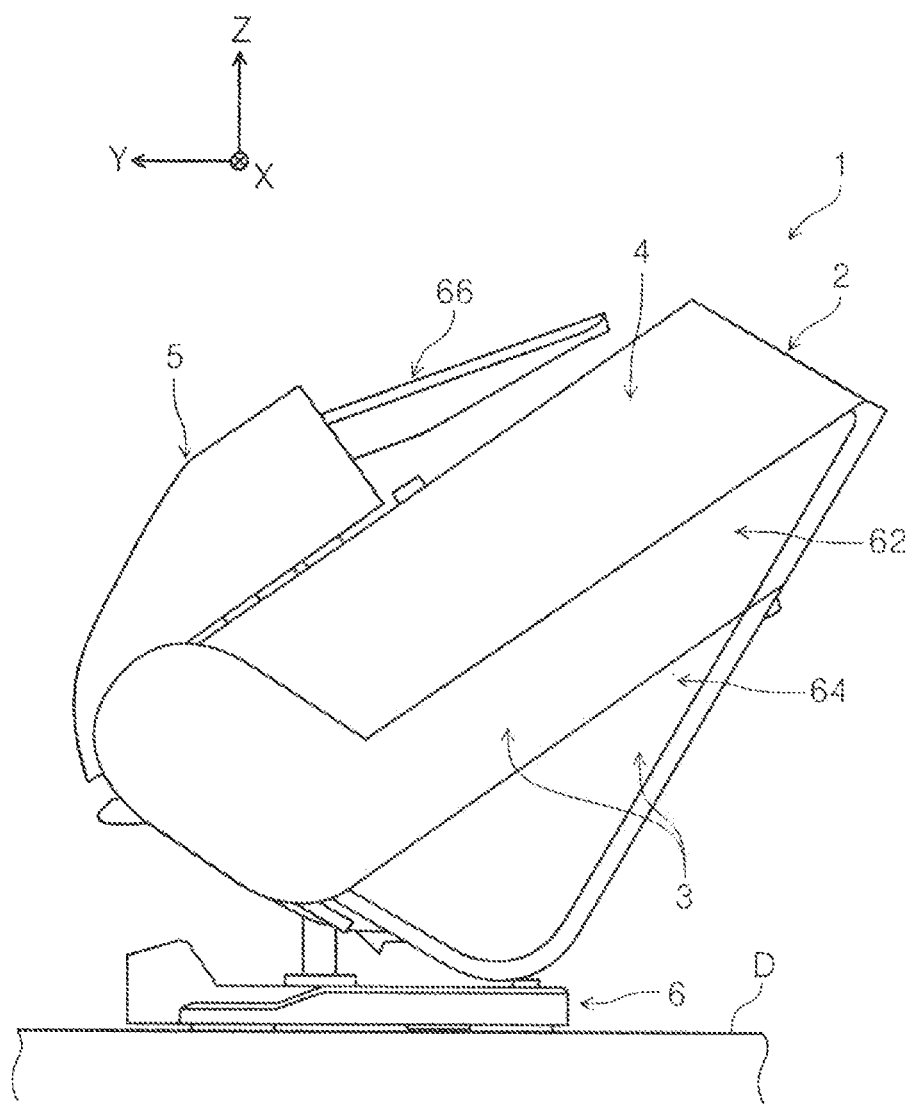
FIG. 2 is a side view, as viewed from one side in the width direction, of the scanner in which the apparatus main body is in a booklet reading posture.

As illustrated in FIG. 2, the scanner 1 can switch the posture to a booklet reading posture, which is inclined with respect to the normal reading posture (FIG. 1). Specifically, the apparatus main body 2 is caused to be inclined with respect to the stand 6 by an operation of a switching mechanism 50 (FIG. 8) described below.

A surface on which the stand 6 is placed is defined as an installation surface D. The installation surface D is an example of a horizontal plane along the X-Y plane.

Figure 3:
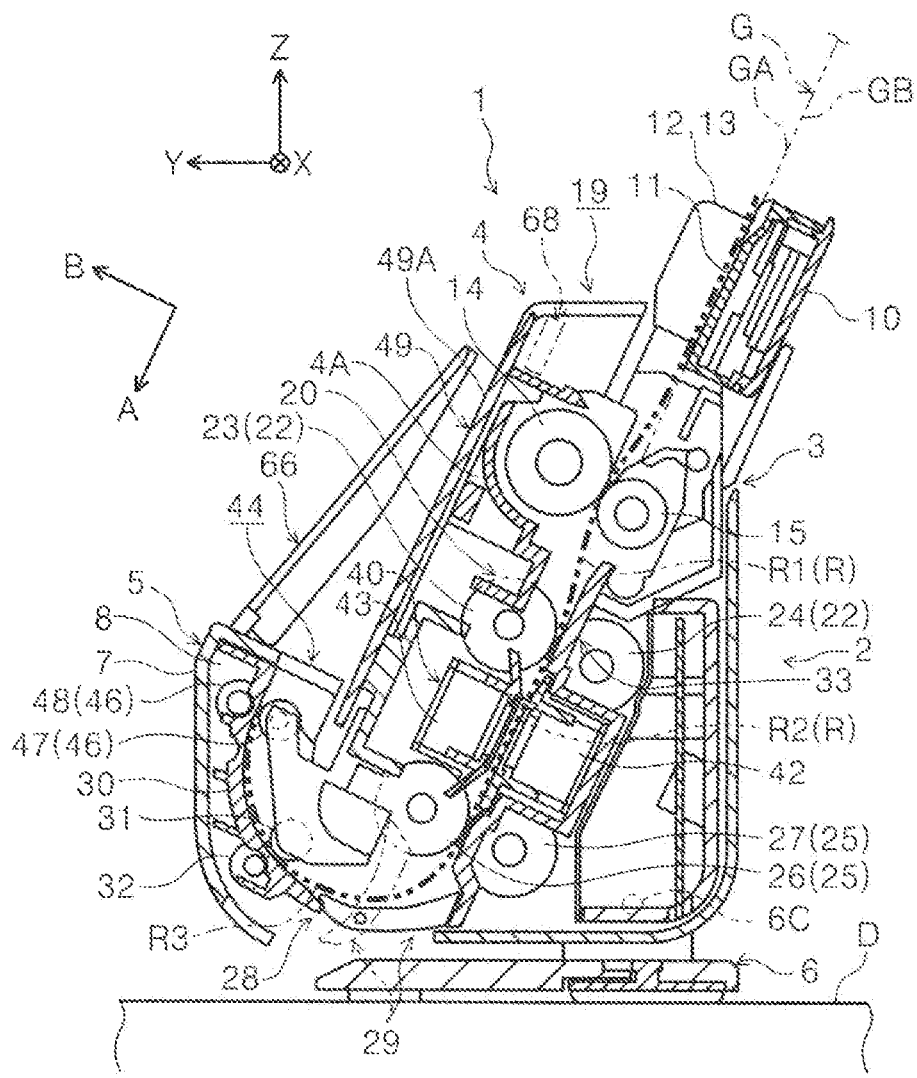
FIG. 3 is a cross-sectional view, as viewed from the one side in the width direction, of the scanner in which the apparatus main body is in the normal reading posture.
Figure 4:
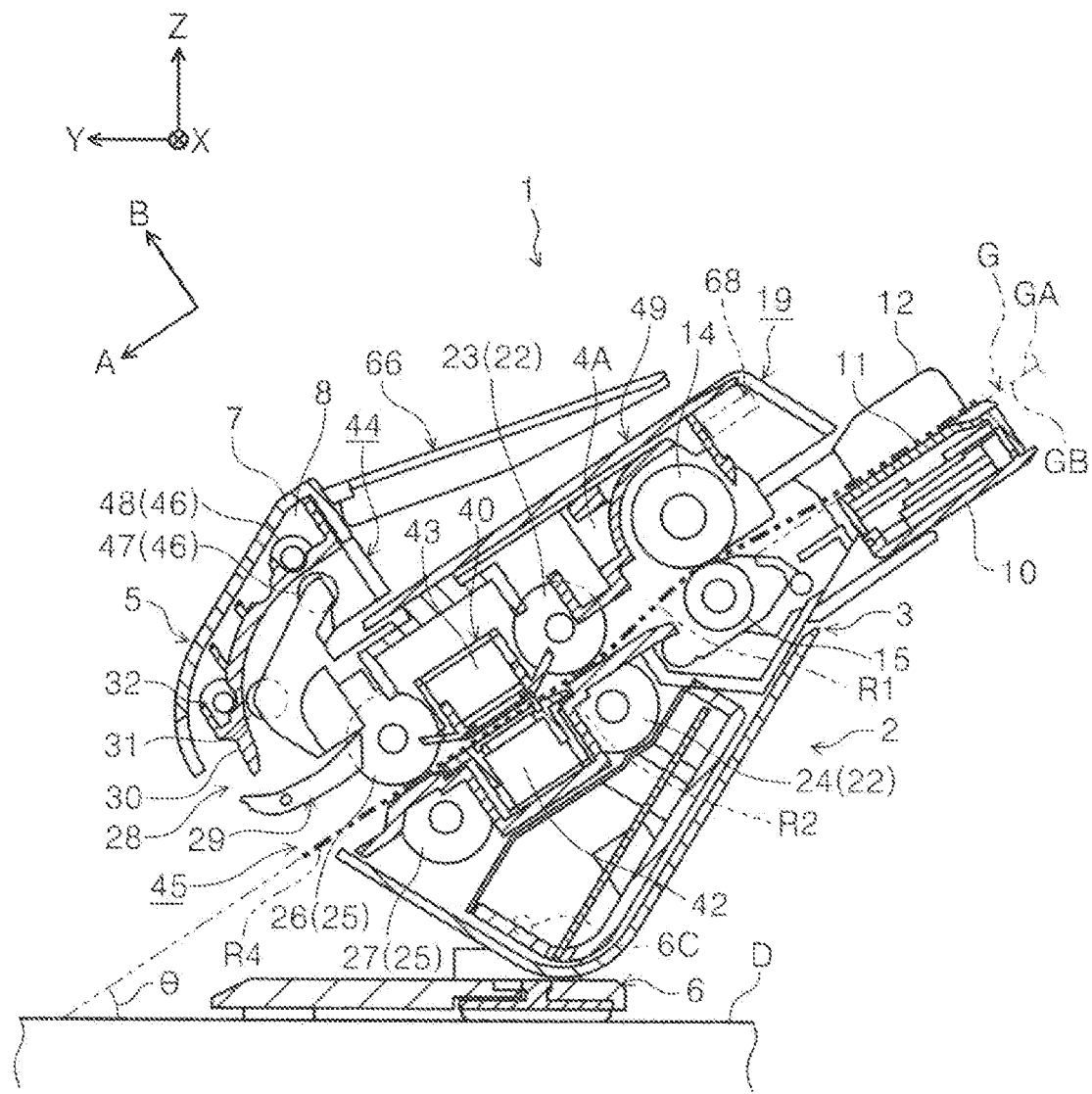
FIG. 4 is a cross-sectional view, as viewed from the one side in the width direction, of the scanner in which the apparatus main body is in the booklet reading posture.

As illustrated in FIG. 3 and FIG. 4, the scanner 1 can read at least one surface of a front surface GA and a back surface GB of the document G, the back surface GB being on the opposite side to the front surface GA.

Hereinafter, a direction in which a transport path R of the document G extends at a position facing the reading unit 40 described below is referred to as the A-axis direction. Of the A-axis direction, a direction in which the document G is transported is referred to as a positive A direction. In other words, the positive A direction is an example of a transport direction. Further, of the A-axis direction, a direction in which the document G is discharged in the normal reading posture described below is referred to as a negative A direction. In other words, the negative A direction is an example of a discharge direction.

The A-axis direction is orthogonal to the X-axis direction. The positive A direction is a direction toward a position in the positive Y direction and the negative Z direction. A direction orthogonal to both the A-axis direction and the X-axis direction is referred to as a B-axis direction.

The B-axis direction is an example of a loading direction of the document G in a document support portion 49 described below. Further, the B-axis direction is an example of a facing direction in which the reading unit 40 described below and a reading path R2 described below face each other. Of the B-axis direction, a direction including a positive Z direction component is referred to as a positive B direction, and a direction including a negative Z direction component is referred to as a negative B direction.

Figure 8:
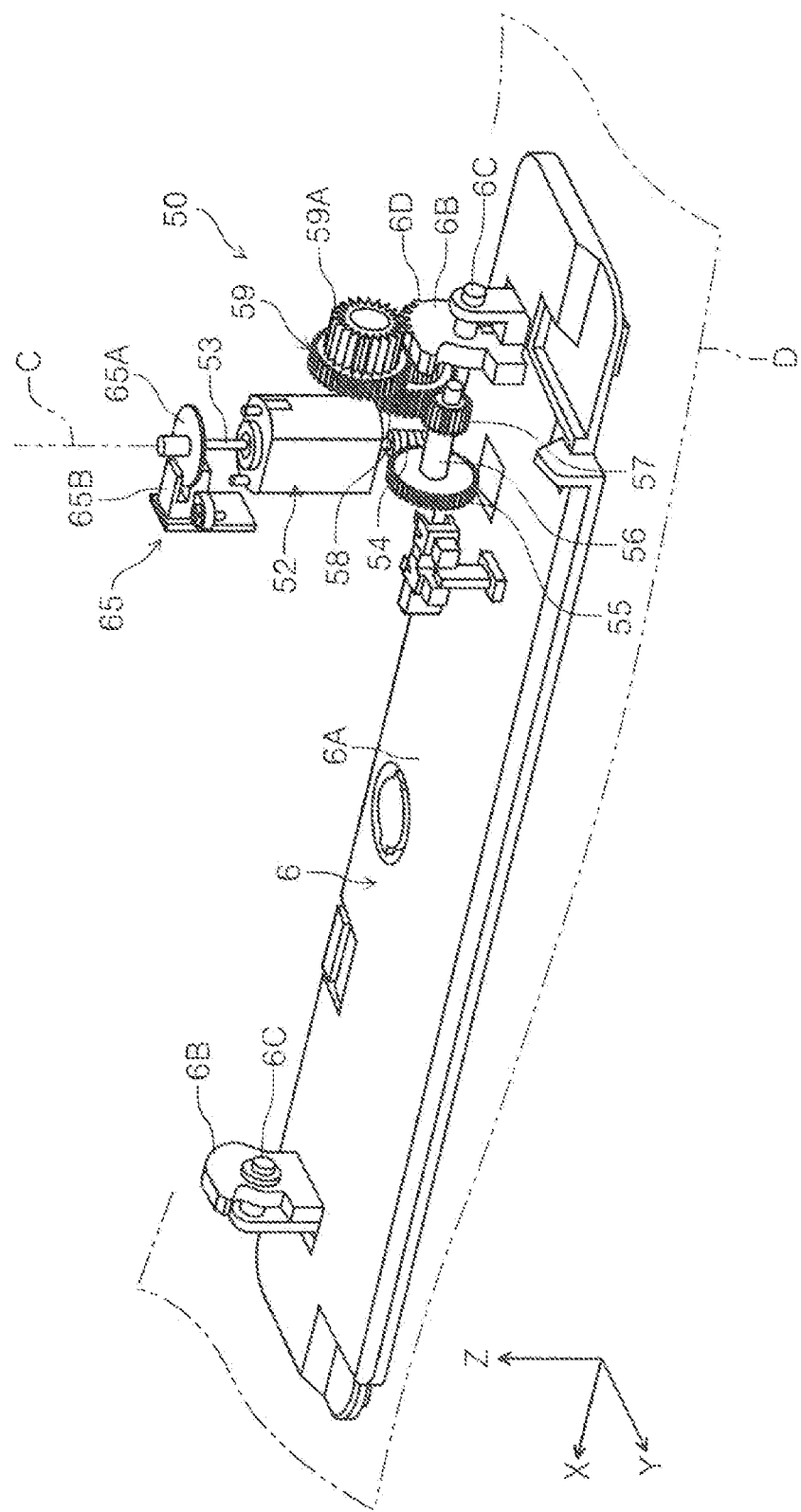
FIG. 8 is a perspective view illustrating each of configurations of a switching mechanism of the scanner.

Specifically, the scanner 1 includes the apparatus main body 2, the stand 6, and the switching mechanism 50 (FIG. 8).

The apparatus main body 2 includes a transport unit 20 that transports the document G along the transport path R described below, and the reading unit 40 that faces the transport path R and reads an image of the document G.

The stand 6 rotatably supports the apparatus main body 2 as an example of a support portion supporting the apparatus main body 2. The stand 6 and the switching mechanism 50 will be described in detail below.

In the apparatus main body 2, the transport path R along which the document G is transported is formed. Specifically, in addition to the transport unit 20 and the reading unit 40, the apparatus main body 2 includes an inversion unit 28, a discharge unit 46, a document support portion 49, a pressing member 66, and an auxiliary member 68.

The first unit 3 includes an upper opening/closing portion 10, a separation roller 15, a second roller 24, a fourth roller 27, a control unit 18, the switching mechanism 50, and a transport motor 36 (FIG. 6), and a first cover member 62 and a second cover member 64 (FIG. 2).

The second unit 4 is located in the positive Y direction with respect to the first unit 3. The second unit 4 supports a first discharge roller 47 described below. The second unit 4 includes a main body frame 4A and the document support portion 49.

In the normal reading posture, the document support portion 49 constitutes a side portion in the positive Y direction of the second unit 4. The document support portion 49 is formed in a plate shape having a predetermined thickness in the B-axis direction. The document support portion 49 is a portion that supports the document G discharged by the discharge unit 46 described below. A support surface 49A, which is a portion of the document support portion 49 and supports the document G, is a plane along the X-A plane, as an example.

As illustrated in FIG. 3 and FIG. 4, the third unit 5 is located in the positive Y direction with respect to the second unit 4. The third unit 5 supports a second discharge roller 48 described below.

The second unit 4 and the third unit 5 are provided so as to be rotatable about a frame rotary shaft (not illustrated). The frame rotary shaft forms the center of a rotary shaft parallel to the X-axis direction. The second unit 4 and the third unit 5 are integrally rotatable about the frame rotary shaft with respect to the first unit 3. By rotating the second unit 4 and the third unit 5 with respect to the first unit 3, a document feeding path R1 and a reading path R2, which will be described below, are exposed.

The third unit 5 can rotate about the frame rotation axis with respect to the first unit 3 and the second unit 4. In other words, the third unit 5 is provided to be movable relative to the second unit 4 such that the second discharge roller 48 can come into contact with and be separated from the first discharge roller 47.

By rotating the third unit 5 with respect to the first unit 3 and the second unit 4, an inversion path R3 described below can be exposed.

The third unit 5 includes, as an example, a front cover 7, a main body frame 8, a frame 30, a lower roller 32, the second discharge roller 48, an operation unit 16 (FIG. 1), and the pressing member 66. The main body frame 8 is a frame that constitutes a base portion of the third unit 5, and supports each of the members constituting the third unit 5.

The apparatus main body 2 is rotatable about a main body rotary shaft 6C with respect to the stand 6. In this embodiment, as a result of being rotated, the apparatus main body 2 can be held in two postures. The posture of the apparatus main body 2 illustrated in FIG. 3 is referred to as the normal reading posture. The posture of the apparatus main body 2 illustrated in FIG. 4 is referred to as the booklet reading posture. The posture of the apparatus main body 2 is switched by the switching mechanism 50 (FIG. 8) described below.

Note that, in this specification, when reference is made simply to the normal reading posture or the booklet reading posture, the posture refers to the posture of the apparatus main body 2. Further, depending on the context, the normal reading posture or the booklet reading posture may also refer to the posture of the scanner 1.

As illustrated in FIG. 4, an angle formed between a line obtained by extending the reading path R2, and the installation surface D is defined as a posture angle θ(°). The posture angle θ in the case of the booklet reading posture is smaller than the posture angle θ in the case of the normal reading posture.

In the normal reading posture, the scanner 1 has the smallest projected area of the apparatus main body 2 on the installation surface D. In other words, in the normal reading posture, the footprint of the apparatus main body 2 becomes smallest. In this specification, the footprint of the scanner 1 corresponds to an area occupied by the scanner 1 in the X-Y plane when the scanner 1 is viewed in the negative Z direction from above in the Z-axis direction.

Figure 6:
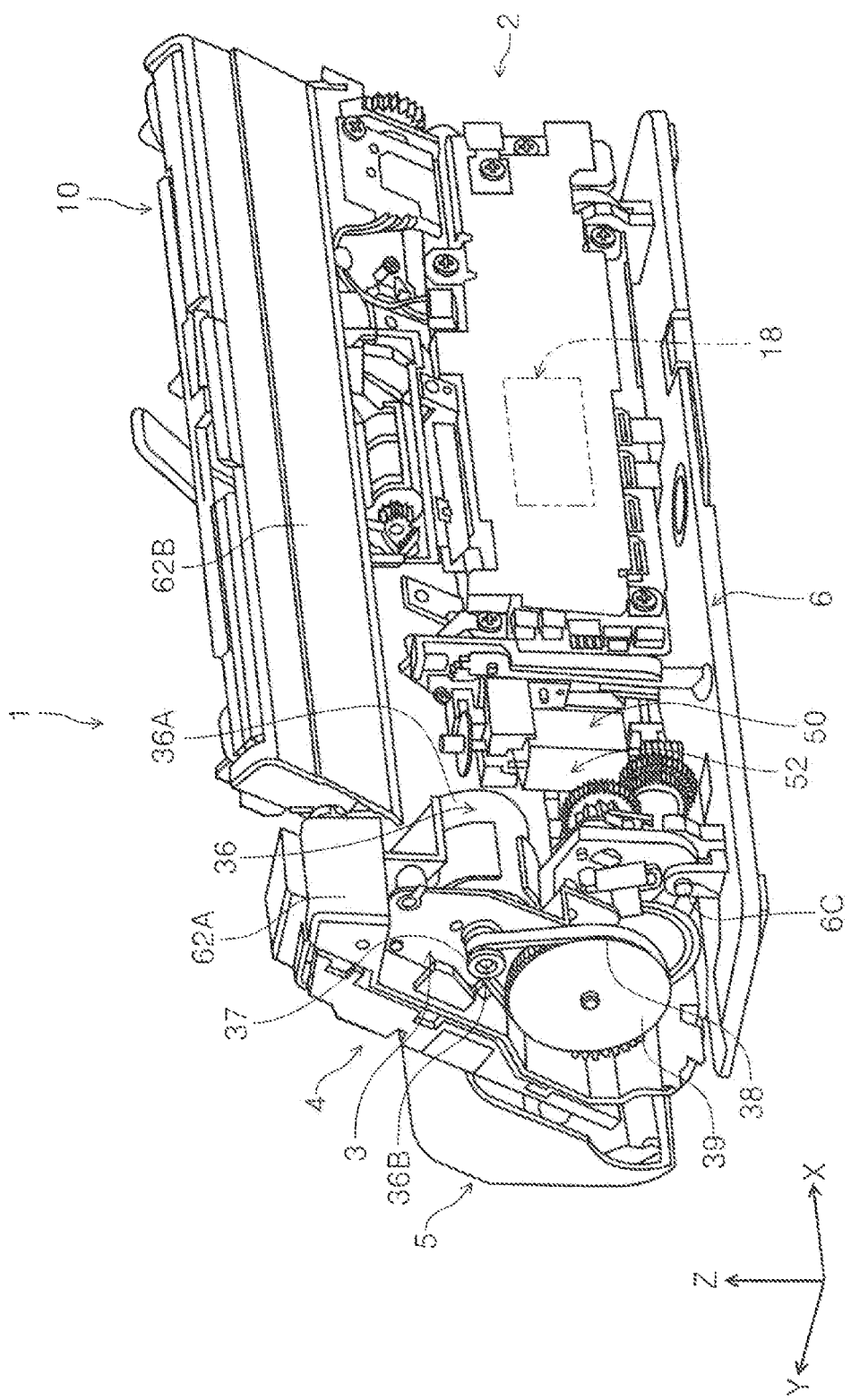
FIG. 6 is a perspective view, as viewed from the rear, of the interior of the scanner in which the apparatus main body is in the normal reading posture.

As illustrated in FIG. 1, the operation unit 16 includes, as an example, operation buttons 16A, 16B, and 16C. The operation unit 16 can transmit and receive signals to and from the control unit 18 (FIG. 6).

The operation buttons 16A, 16B, and 16C are provided at the front cover 7. Functions, such as an ON/OFF switch of the power of the scanner 1, are assigned to the operation buttons 16A, 16B, and 16C.

As illustrated in FIG. 3, the first unit 3 includes the upper opening/closing portion 10 that functions as a lid of the transport path R.

The upper opening/closing portion 10 is rotated about a shaft (not illustrated) so as to open and close a feeding port 19. Note that in this embodiment, "feed" refers to an initial stage of transport, and is included in the "transport".

A placement portion 11 described below is formed at the upper opening/closing portion 10. The document G to be fed is supported by the placement portion 11 so as to be in an inclined posture When a plurality of the documents G are placed on the placement portion 11, the uppermost document G is fed downstream in the positive A direction by the feed roller 14.

Figure 11:
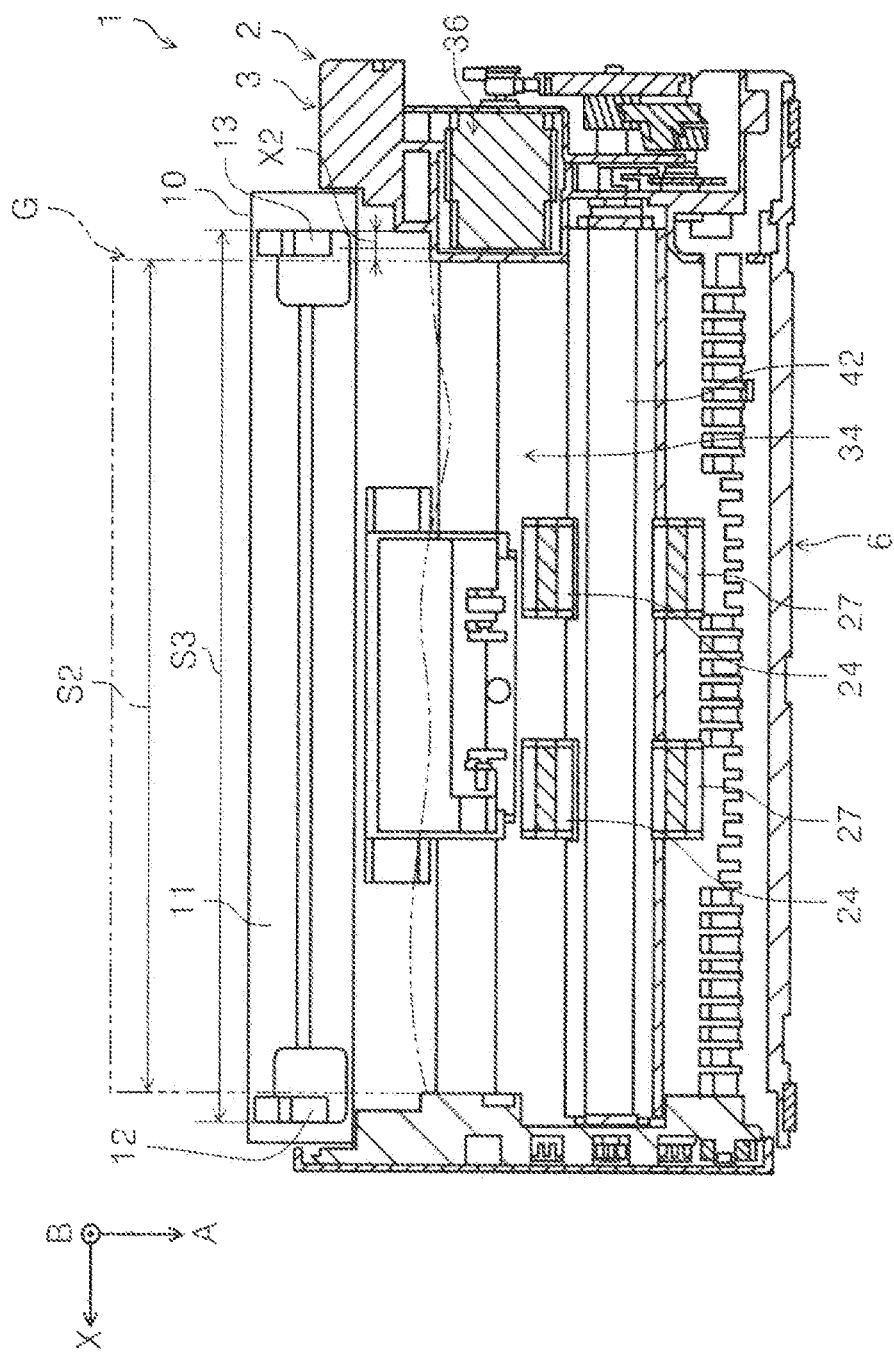
FIG. 11 is a front view, as viewed from the front, of the internal structure of the scanner including a guide member.
Figure 12:
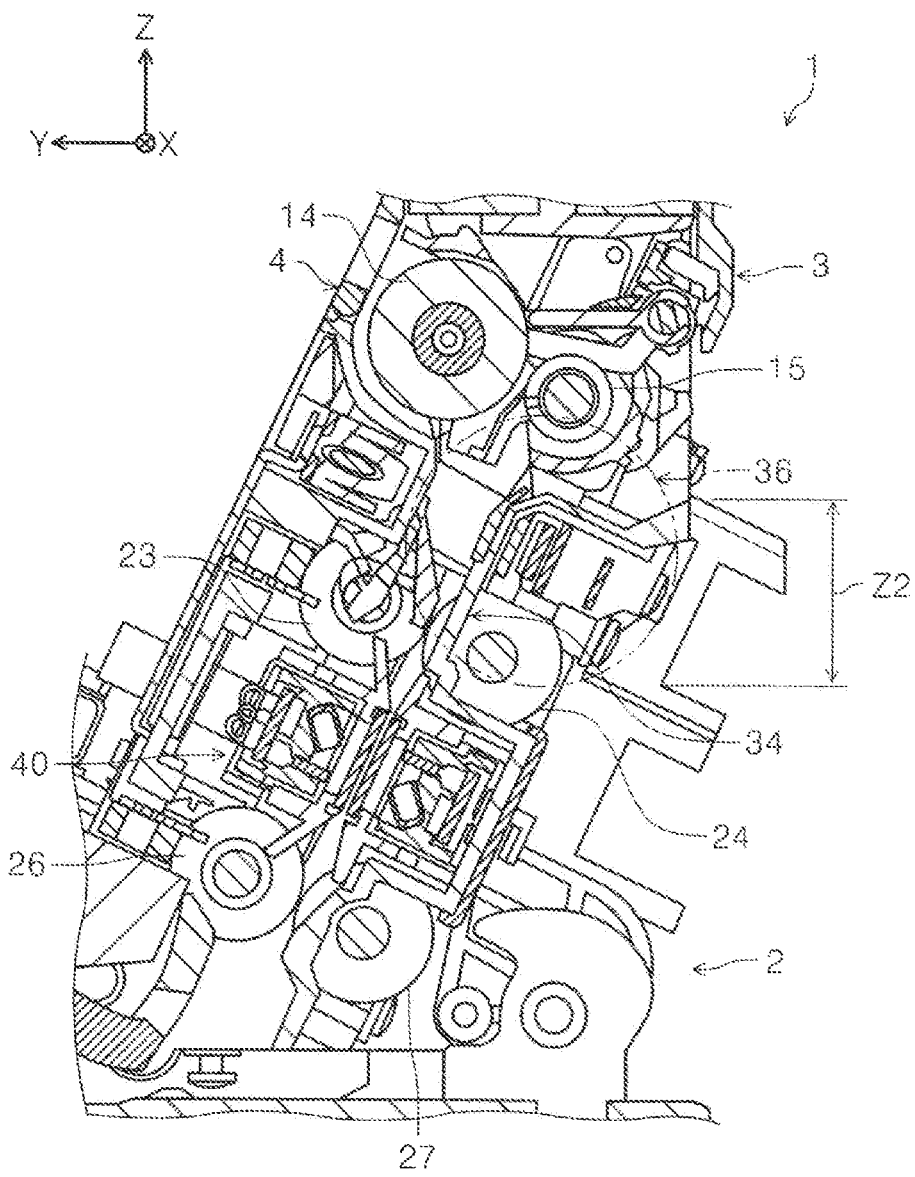
FIG. 12 is a cross-sectional view, as viewed from the one side in the width direction, of the internal structure of the scanner in which the apparatus main body is in the normal reading posture.

As illustrated in FIG. 11, the apparatus main body 2 includes the placement portion 11, and edge guides 12 and 13.

The placement portion 11 is a portion, of the first unit 3 of the apparatus main body 2, on which a portion of the document G before being transported is placed.

The edge guides 12 and 13 are provided to be movable in the X-axis direction at the placement portion 11. Specifically, the edge guides 12 and 13 are disposed spaced apart in the X-axis direction. The edge guides 12 and 13 are configured, using a mechanism including a rack and a pinion (not illustrated), to be movable along the X-axis direction to a side on which the edge guides 12 and 13 come closer to each other, or a side on which the edge guides 12 and 13 move away from each other. The edge guides 12 and 13 align both end portions in the X-axis direction of the plurality of documents G stacked on the placement portion 11. Note that, of a region in the X-direction in which the edge guide 12 and the edge guide 13 are movable, the largest region is referred to as a movable region S3.

In the scanner 1, the document G is fed using a center feeding method, as an example.

As illustrated in FIG. 3, the second unit 4 is provided with the feed roller 14. The feed roller 14 rotates by receiving power from the transport motor 36 described below (FIG. 6). Then, the feed roller 14 feeds the document G to a first transport roller pair 22.

In the first unit 3, the separation roller 15 is provided at a position facing the feed roller 14. A rotational torque is applied to the separation roller 15 by a torque limiter (not illustrated), and the separation roller 15 suppresses multifeed of the document G. The feed roller 14 and the separation roller 15 are each provided at a central position in the X-axis direction, as an example.

Note that a separation pad may be provided instead of the separation roller 15.

Further, in this embodiment, the feed roller 14 is provided on the upper side of the documents G placed on the placement portion 11, and the documents G are fed from the uppermost document. However, the feed roller 14 may be provided on the lower side of the documents G placed on the placement portion 11, and the documents G may be fed from the lowermost document G The transport unit 20 is provided downstream of the feed roller 14 and the separation roller 15.

The transport unit 20 includes, as an example, the first transport roller pair 22, a second transport roller pair 25, an upper roller 31, a lower roller 32, a guide member 33, and the transport motor 36.

The first transport roller pair 22, the second transport roller pair 25, the upper roller 31, and the lower roller 32 are each an example of a transport member for transporting the document G.

The first transport roller pair 22 includes a first roller 23 provided at the second unit 4, and a second roller 24 provided at the first unit 3. The first transport roller pair 22 transports the document G by rotating while pressing the document G.

The first roller 23 is provided so as to be able to advance and retreat in the B-axis direction with respect to the second roller 24. Both the first roller 23 and the second roller 24 rotate by receiving power from the transport motor 36.

When the second unit 4 is closed with respect to the first unit 3, the first roller 23 and the second roller 24 form a nip by coming into contact with each other. When the second unit 4 is opened with respect to the first unit 3, the first roller 23 is separated from the second roller 24.

The reading unit 40 that reads the image of the document G is provided downstream in the positive A direction of the first transport roller pair 22.

The reading unit 40 includes a first reading unit 42 and a second reading unit 43, which face each other in the B-axis direction. In this embodiment, the first reading unit 42 and the second reading unit 43 are each constituted by a contact image sensor module (CISM), as an example. The reading unit 40 reads the document G transported by the first transport roller pair 22.

The first reading unit 42 is provided at the first unit 3. The first reading unit 42 reads the back surface GB of the document G.

The second reading unit 43 is provided at the second unit 4. The second reading unit 43 reads the front surface GA of the document G. Note that the second reading unit 43 is provided so as to be movable in the B-axis direction.

The first reading unit 42 and the second reading unit 43 have the same structure except for the positions at which they are disposed, as an example. Therefore, in the following description, the first reading unit 42 will be described as the reading unit 40, and a description of the second reading unit 43 will be omitted.

The second transport roller pair 25 is provided downstream in the positive A direction of the reading unit 40.

Figure 13:
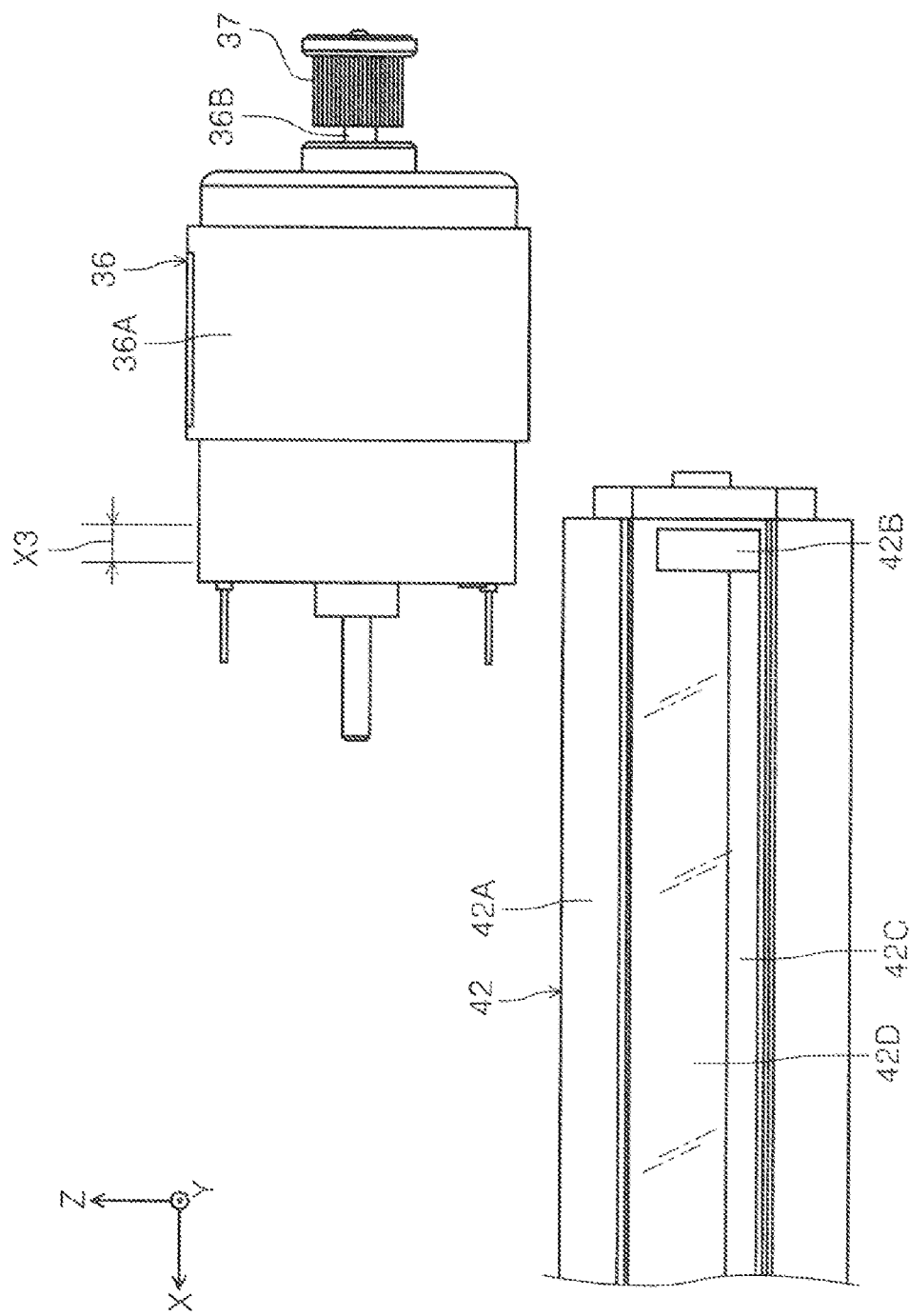
FIG. 13 is a front view, as viewed from the front, of a first reading unit and a transport motor of the scanner in which the apparatus main body is in the normal reading posture.

As illustrated in FIG. 13, as an example, the first reading unit 42 includes a main body portion 42A, a light source unit 42B, a light-guiding unit 42C, and a transmission unit 42D.

The main body portion 42A is constituted by a holder extending in the X-axis direction, and supports the light source unit 42B, the light-guiding unit 42C, and the transmission unit 42D.

The light source unit 42B is located at an end portion in the negative X direction of the main body portion 42A. The light source unit 42B irradiates the document G with light via the light-guiding unit 42C.

The light-guiding unit 42C extends in the X-axis direction in alignment with a reading region (not illustrated) of the document G. The light-guiding unit 42C guides, in the X-axis direction, the light incident from the light source unit 42B, and emits the light toward the document G.

The transmission unit 42D protects the light source unit 42B and the light-guiding unit 42C, and transmits the light traveling from the light-guiding unit 42C toward the document G.

As illustrated in FIG. 3, the second transport roller pair 25 includes a third roller 26 provided at the second unit 4, and the fourth roller 27 provided at the first unit 3. The second transport roller pair 25 transports the document G by rotating while pressing the document G.

The third roller 26 is provided so as to be able to advance and retreat in the B-axis direction with respect to the fourth roller 27. Both the third roller 26 and the fourth roller 27 rotate by receiving power from the transport motor 36 (FIG. 6).

When the second unit 4 is closed with respect to the first unit 3, the third roller 26 and the fourth roller 27 form a nip by coming into contact with each other. When the second unit 4 is opened with respect to the first unit 3, the third roller 26 is separated from the fourth roller 27.

Figure 5:
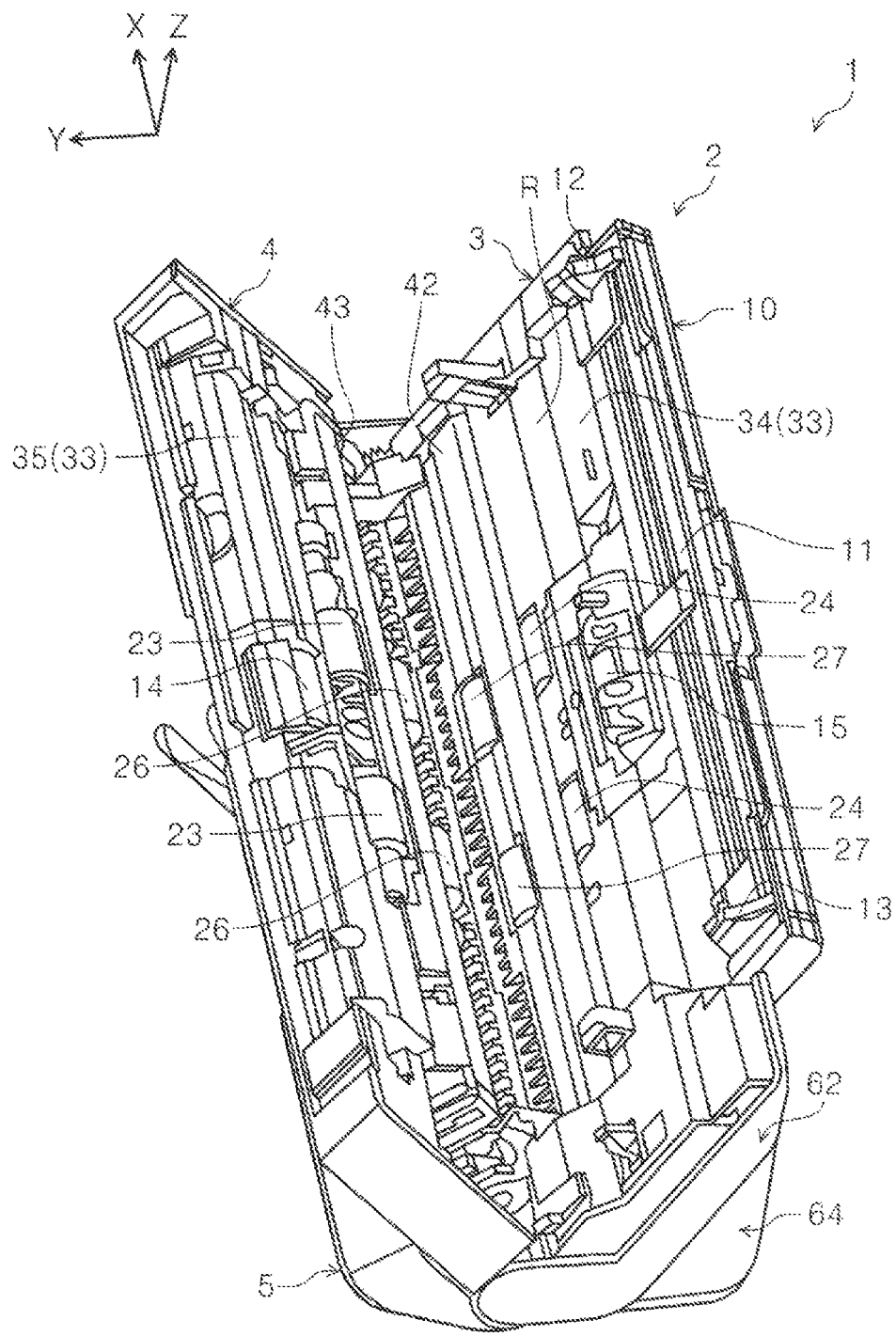
FIG. 5 is a perspective view illustrating a state in which a second unit is open with respect to a first unit.

As illustrated in FIG. 5, the guide member 33 constitutes a portion of the transport path R, and is a member for guiding the document G. The length in the X-axis direction of the guide member 33 is greater than the length in the X-axis direction of the document G. The guide member 33 includes a first guide member 34 and a second guide member 35.

The first guide member 34 is provided at the first unit 3. The first guide member 34 constitutes a wall portion in the negative Z direction of the transport path R.

The second guide member 35 is provided at the second unit 4. The second guide member 35 constitutes a wall portion in the positive Z direction of the transport path R.

An angle formed between the guide member 33 and the installation surface D (FIG. 3) changes when the posture of the apparatus main body 2 is switched.

As illustrated in FIG. 6, the transport motor 36 is an example of a transport drive source for rotationally driving the first transport roller pair 22, the second transport roller pair 25, and the lower roller 32 (FIG. 3). The transport motor 36 also rotationally drives other rollers of the scanner 1. For example, the second discharge roller 48 (FIG. 3) is rotationally driven by the transport motor 36.

The transport motor 36 is provided at an end portion in the negative X direction of the apparatus main body 2. The transport motor 36 includes a motor main body 36A having a cylindrical shape, and a rotary shaft 36B extending from the motor main body 36A in the negative X direction. A drive pulley 37 is provided at the rotary shaft 36B. A driving force is transmitted from the drive pulley 37 to a driven pulley 39 via a belt 38. The driving force transmitted to the driven pulley 39 is transmitted to each of the rollers via a set of toothed gears (not illustrated).

As illustrated in FIG. 3 and FIG. 4, in the apparatus main body 2, the transport route R includes the document feeding path R1, the reading path R2, and a non-inversion transport path R4 (FIG. 4). In this embodiment, the transport path R is a substantially straight path. In other words, the inversion path R3 (FIG. 3), which is a curved path along which the document G is inverted, is not included in the transport path R. Note that, since a switch is made between the inversion path R3 and the non-inversion path R4, the inversion path R3 and the non-inversion transport path R4 do not constitute a path simultaneously.

The document feeding path R1 is a path extending from the placement portion 11 to the nip formed by the first transport roller pair 22, via the nip position of the feed roller 14 and the separation roller 15.

The reading path R2 is a path facing the reading unit 40. The reading path R2 is a straight path extending from the nip formed by the first transport roller pair 22 to the nip formed by the second transport roller pair 25, via the position at which the reading path R2 faces the reading unit 40.

The inversion path R3 is a path located downstream of the reading path R2 when the apparatus main body 2 is in the normal reading posture. After being read, the document G is inverted upward at the inversion path R3, and is discharged diagonally upward from a first discharge port 44. The upper roller 31, the lower roller 32, and the discharge unit 46 are located at the inversion path R3.

The non-inversion transport path R4 is a path located downstream of the reading path R2 when the apparatus main body 2 is in the booklet reading posture. After being read, the document G is discharged diagonally downward from a second discharge port 45 without being inverted at the non-inversion transport path R4. Note that the second transport roller pair 25 functions as a discharge roller pair that discharges the document G from the non-inversion transport path R4. The non-inversion transport path R4 is a path from the second transport roller pair 25 to the second discharge port 45, that is, a path from the second transport roller pair 25 to the outside of the apparatus main body 2 (see FIG. 4). However, the non-inversion transport path R4 may be a path from the second transport roller pair 25 to the installation surface D.

The inversion unit 28 is a unit constituting the inversion path R3. In other words, the inversion unit 28 is a unit in which, after the document G has been read by the reading unit 40, one of the front and back surfaces GA and GB of the document G is inverted to the other of the front and back surfaces GA and GB, the front and back surfaces GA and GB being the front and back of the document G.

The inversion unit 28 includes a switching flap 29, the frame 30, the upper roller 31, and the lower roller 32, as an example.

The switching flap 29 is located downstream of the second transport roller pair 25 in the positive A direction. As a result of being rotated by a solenoid (not illustrated), the switching flap 29 enables the document G to be transported along one of the inversion path R3 and the non-inversion transport path R4, thereby restricting the document G from being transported along the other of the inversion path R3 and the non-inversion transport path R4. In other words, the switching flap 29 switches between the inversion path R3 and the non-inversion transport path R4. In this embodiment, the switching flap 29 is configured to rotate in conjunction with the switching of the posture of the apparatus main body 2.

The frame 30 guides the document G toward the first discharge port 44.

The upper roller 31 is located in the positive Z direction with respect to the inversion path R3 in the normal reading posture, and rotated about a shaft along the X-axis direction.

The lower roller 32 is located in the negative Z direction with respect to the inversion path R3 in the normal reading posture, and rotated about a shaft along the X-axis direction.

The upper roller 31 and the lower roller 32 are driven by the transport motor 36 (FIG. 6), and transport the document G.

The discharge unit 46 is located downstream of the upper roller 31 and the lower roller 32. The discharge unit 46 discharges the document G, which has been inverted by the inversion unit 28, from the first discharge port 44 in the negative A direction. The discharge unit 46 includes a first discharge roller 47 provided at the second unit 4, and a second discharge roller 48 provided at the third unit 5.

The first discharge roller 47 is located in the negative Y direction with respect to the inversion path R3 in the normal reading posture.

The second discharge roller 48 is located in the positive Y direction with respect to the inversion path R3 in the normal reading posture.

The first discharge roller 47 and the second discharge roller 48 are driven by the transport motor 36, and discharge the document G from the first discharge port 44.

As illustrated in FIG. 6, the control unit 18 is provided at the first unit 3, as an example. The control unit 18 performs various types of control of the scanner 1, including feed, transport, and discharge control, and reading control of the document G. Signals from an operation unit (not illustrated) are input to the control unit 18. The control unit 18 controls operations of the transport motor 36 and a switching motor 52. In this embodiment, each of the motors is a DC motor.

Signals from a placement detection unit, a multi-feed detection unit, a document detection unit, a posture detection sensor, and the like, which are not illustrated, are also input to the control unit 18.

As illustrated in FIG. 3, the pressing member 66 is provided at an edge portion of the first discharge port 44 at the third unit 5. The pressing member 66 presses the document G toward the document support portion 49.

The auxiliary member 68 is provided at a portion in the negative Y direction with respect to an end portion in the positive Z direction of the document support portion 49 at the second unit 4. The auxiliary member 68 supports a portion of the document G placed on the document support portion 49.

Note that both the pressing member 66 and the auxiliary member 68 can be housed in the apparatus main body 2.

Figure 7:
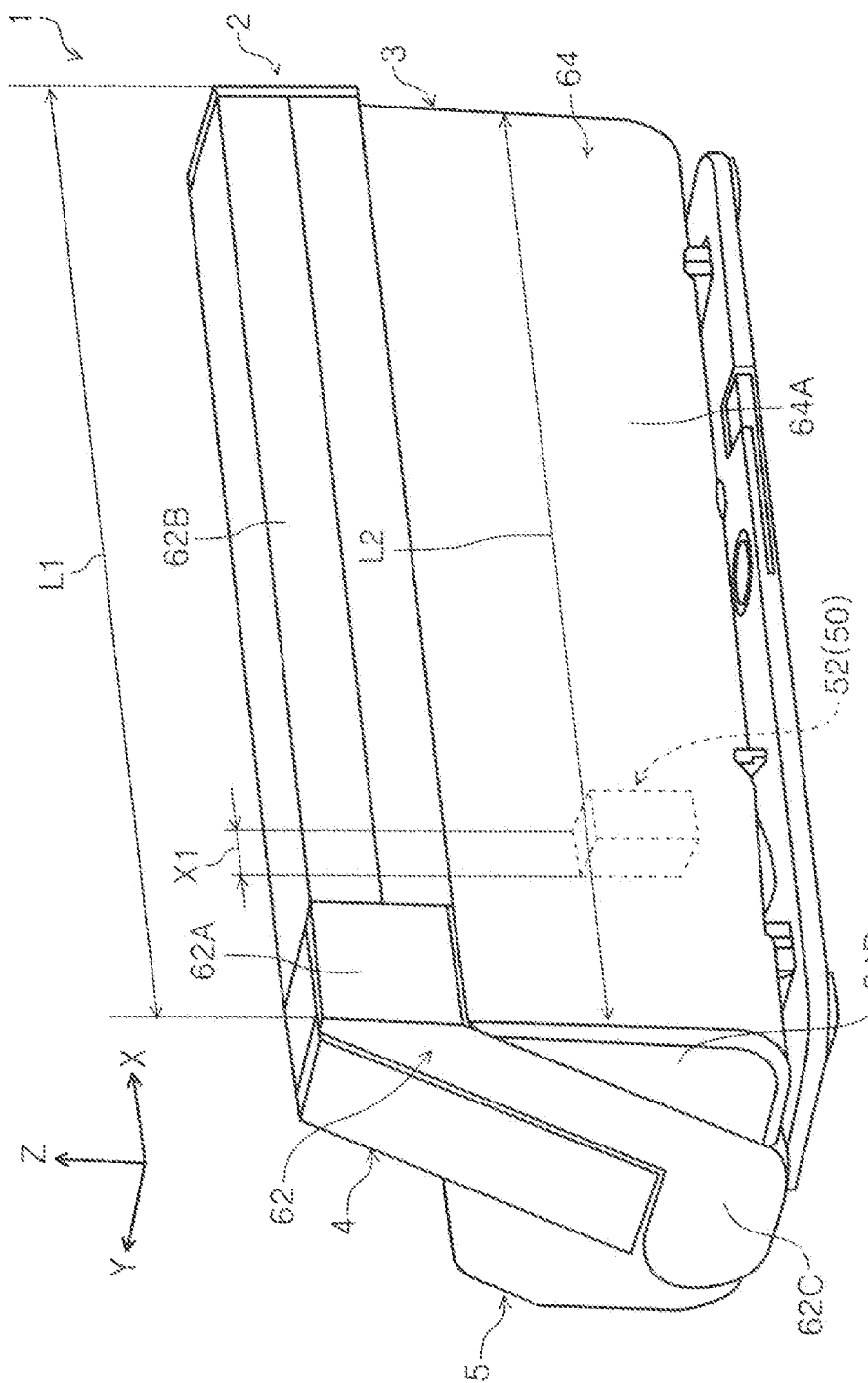
FIG. 7 is a perspective view, as viewed from the rear, of the scanner in which the apparatus main body is in the normal reading posture.

As illustrated in FIG. 7, the apparatus main body 2 includes the first cover member 62 and the second cover member 64.

The first cover member 62 is provided at the first unit 3. The first cover member 62 constitutes side portions of the apparatus main body 2 in the X-axis direction and the Y-axis direction. The first cover member 62 includes a rear wall 62A that stands upright at an end portion in the positive Z direction of the first unit 3, a movable wall 62B that is rotated in conjunction with an operation of the upper opening/closing portion 10, and side walls 62C that stand upright at both end portions in the X-axis direction of the first unit 3.

The length of the first cover member 62 in the X-axis direction is set to a first length L1 (mm).

The second cover member 64 is provided at the first unit 3. When viewed from the X-axis direction, the second cover member 64 constitutes side portions of the apparatus main body 2 on the back surface side, the second cover member 64 being further away, in the negative Y direction, from the placement portion 11 (FIG. 5) on which the document G is placed, than the first cover member 62. The second cover member 64 includes a rear wall 64A that stands upright at an end portion in the negative Y direction of the first unit 3, and side walls 64B that stand upright at both the end portions in the X-axis direction of the first unit 3.

The rear wall 64A is located in the negative Z direction with respect to the rear wall 62A and the movable wall 62B. The side walls 64B are located in the negative Z direction with respect to the side walls 62C.

The rear wall 64A is formed in a rectangular shape having the dimension in the X-axis direction longer than the dimension in the Z-axis direction. When viewed from the X-axis direction, the side wall 64B has an outer shape of a right angled triangle whose right angle portion has an R shape. In this way, the second cover member 64 constitutes the side portions of the apparatus main body 2 in the X-axis direction and the Y-axis direction.

The length of the second cover member 64 in the X-axis direction is set to a second length L2 (mm). The second length L2 is shorter than the first length L1. As a result, a stepped portion is formed between the first cover member 62 and the second cover member 64.

A color of the second cover member 64 is darker than a color of the first cover member 62, as an example. Thus, the scanner 1 looks smaller compared to a configuration in which both the color of the first cover member 62 and the color of the second cover member 64 are light colors.

As an example, the color of the second cover member 64 may be set so that the brightness of the color of the second cover member 64 is different from that of the color of the first cover member 62 by 3 or more on the Munsell value scale.

Note that the second length L2 of the second cover member 64 may be equal to or greater than the first length L1 of the first cover member 62.

As illustrated in FIG. 8, the stand 6 includes, as an example, a base plate portion 6A, two standing wall portions 6B, the main body rotary shaft 6C, and a toothed portion 6D.

The base plate portion 6A is placed on the installation surface D. The base plate portion 6A is a rectangular plate-like member having the dimension in the X-axis direction longer than the dimension in the Y-axis direction.

The two standing wall portions 6B stand upright from the base plate portion 6A in the positive Z direction. The two standing wall portions 6B are disposed spaced apart in the X-axis direction, and support both the end portions in the X-axis direction of the apparatus main body 2 (FIG. 3).

The main body rotary shaft 6C is provided at the standing wall portions 6B, and extends in the X-axis direction. The main body rotary shaft 6C penetrates a supported portion (not illustrated) provided at the first unit 3 (FIG. 3). As a result, the apparatus main body 2 can rotate about the main body rotary shaft 6C and switch the posture.

The toothed portion 6D is formed at an end portion in the positive Z direction of the standing wall portion 6B. The toothed portion 6D is formed along an imaginary circle (not illustrated) centered about the main body rotary shaft 6C. The toothed portion 6D meshes with a toothed gear portion 59A of the switching mechanism 50 described below.

The switching mechanism 50 switches the posture of the apparatus main body 2 (FIG. 3) with respect to the stand 6 so that the transport path R (FIG. 3) extends along an intersecting direction intersecting the installation surface D. The switching mechanism 50 includes, as an example, the switching motor 52, a toothed gear 55, a shaft 56, a toothed gear 57, a first composite toothed gear 58, and a second composite toothed gear 59. A rotation detecting unit 65 is provided at the switching mechanism 50.

The switching motor 52 is an example of a switching drive source that imparts a driving force to the apparatus main body 2 when switching the posture of the apparatus main body 2. The switching motor 52 is located inside the apparatus main body 2 on the lower side of the transport path R in the Z-axis direction.

Figure 9:
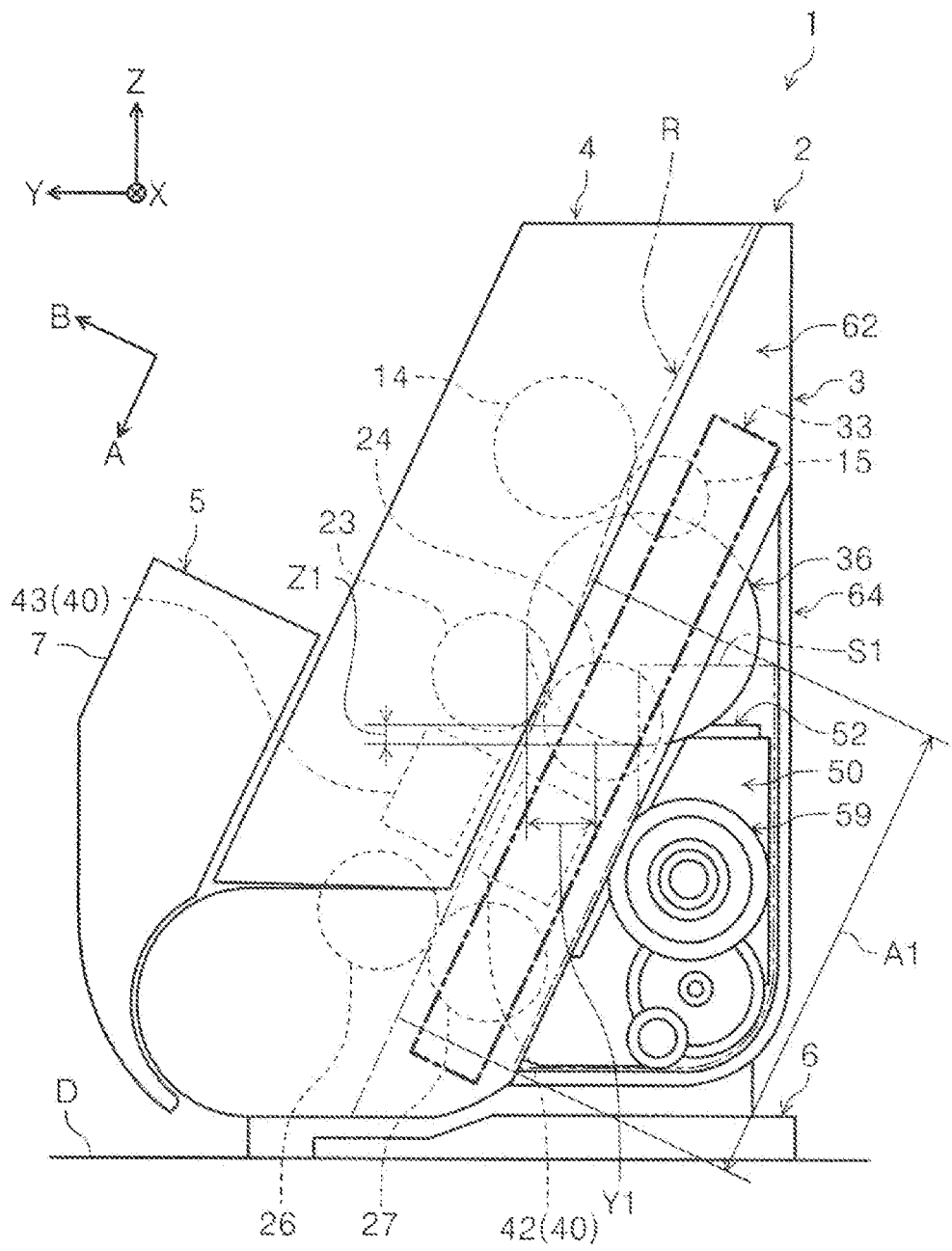
FIG. 9 is a side view, as viewed from the one side in the width direction, of the interior of the scanner in which the apparatus main body is in the normal reading posture.

Note that, in this embodiment, in the normal reading posture of the apparatus main body 2, a portion of the switching motor 52 is located on the lower side of the transport path R in the Z-axis direction, and a portion thereof is not located on the lower side of the transport path R in the Z-axis direction (see FIG. 9). In this manner, it is sufficient that at least a portion of the switching motor 52 be located on the lower side of the transport path R in the Z-axis direction. However, the entire switching motor 52 may be located on the lower side of the transport path R in the Z-axis direction.

Figure 10:
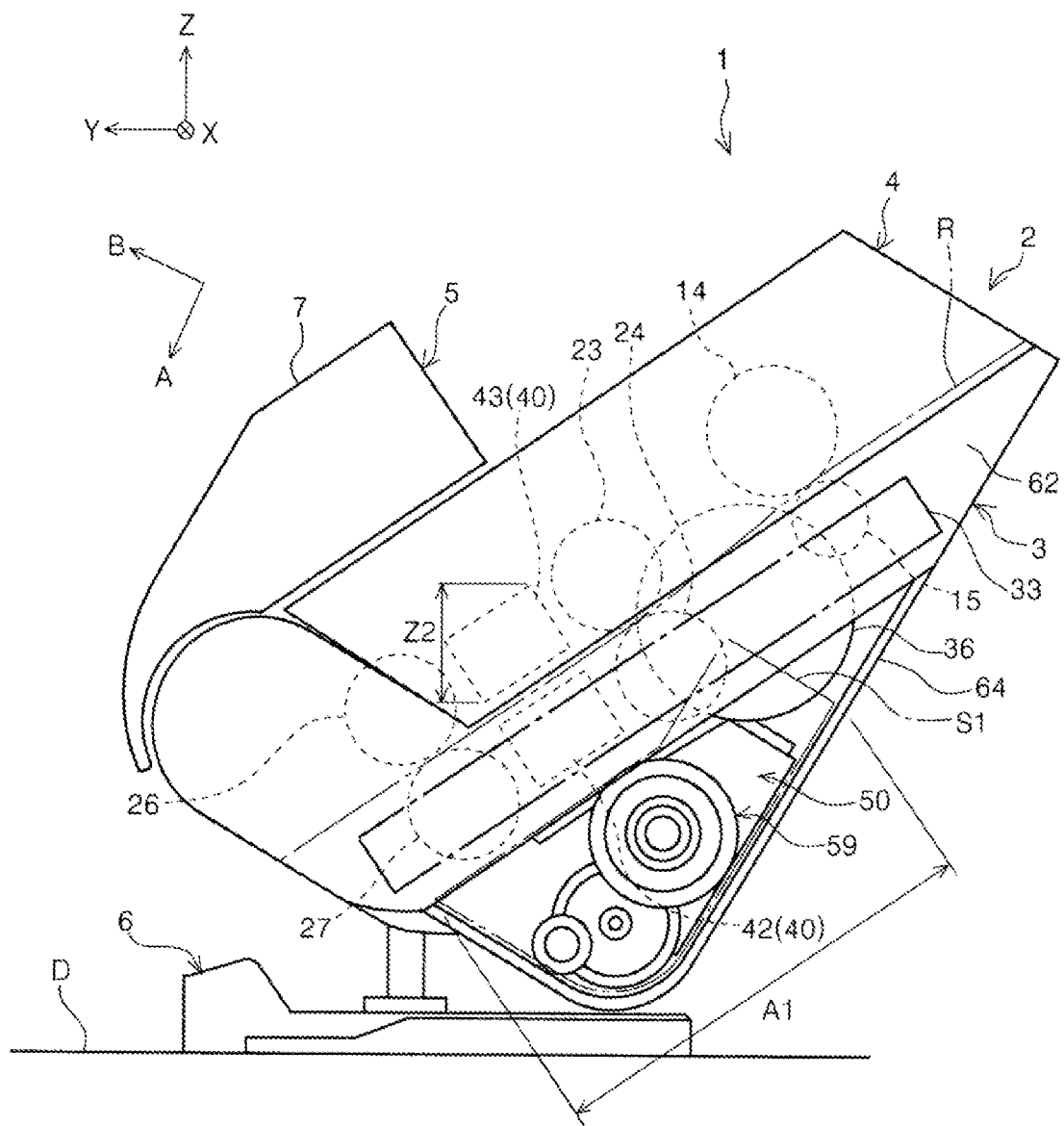
FIG. 10 is a side view, as viewed from the one side in the width direction, of the scanner in which the apparatus main body is in the booklet reading posture.

Further, in this embodiment, in the booklet reading posture of the apparatus main body 2, the entire switching motor 52 is located on the lower side of the transport path R in the Z-axis direction (see FIG. 10). However, in the booklet reading posture of the apparatus main body 2, not all of the switching motor 52, but only a portion of the switching motor 52 may be located on the lower side of the transport path R in the Z-axis direction.

The switching motor 52 includes the rotary shaft 53.

The rotary shaft 53 extends from the switching motor 52 along the Z-axis direction, both in the positive Z direction and the negative Z direction. In other words, an imaginary line C obtained by extending the center line of the rotary shaft 53 extends in the Z-axis direction, as an example. Then, the imaginary line C intersects with the installation surface D on which the stand 6 is installed.

In this embodiment, the imaginary line C intersects with the installation surface D in both the normal reading posture and the booklet reading posture. Note that the imaginary line C may be parallel to the installation surface D in one posture of a plurality of the postures of the apparatus main body 2.

A worm gear 54 is provided at an end portion in the negative Z direction of the rotary shaft 53.

The driving force of the switching motor 52 is transmitted from the worm gear 54 to the first composite toothed gear 58 via the toothed gear 55, the shaft 56, and the toothed gear 57. Further, the driving force is transmitted from the first composite toothed gear 58 to the second composite toothed gear 59.

The second composite toothed gear 59 includes the toothed gear portion 59A. The toothed gear portion 59A meshes with the toothed portion 6D.

The rotation detection unit 65 is, as an example, a rotary encoder provided with a rotary circular plate 65A provided at an end portion in the positive Z direction of the rotary shaft 53, and a detection unit 65B.

The control unit 18 (FIG. 6) uses the rotation detection unit 65 to detect the rotation amount of the switching motor 52, in order to ascertain the rotational direction and the rotation amount of the switching motor 52. In other words, the control unit 18 ascertains whether the posture of the apparatus main body 2 is the normal reading posture or the booklet reading posture.

Next, an arrangement relationship between each of the members will be described. Note that the arrangement relationship between each of the members described below is assumed to be an arrangement relationship in one of the normal reading posture and the booklet reading posture of the apparatus main body 2, when either of the postures is expressly mentioned in the description. However, it goes without saying that the arrangement relationship between each of the members is not limited to an example described below. In other words, an arrangement relationship in one of the postures may, of course, be an arrangement relationship in the other posture, or may, of course, be an arrangement relationship in both of the postures.

As illustrated in FIG. 7, the switching motor 52 overlaps with the second cover member 64 in the X-axis direction. Specifically, the switching motor 52 overlaps with the second cover member 64 over a range of a length X1 (mm) in the X-axis direction. Note that the overlapping state between the switching motor 52 and the second cover member 64 in the X-axis direction is constant regardless of the posture of the scanner 1.

Note that, in this embodiment, the entire switching mechanism unit 50 overlaps with the second cover member 64 in the X-axis direction. However, a portion of the switching mechanism unit 50 may be provided on the outer side of the second cover member 64, and at this time, the portion of the switching mechanism 50 need not necessarily overlap with the second cover member 64.

In FIG. 9 and FIG. 10, the switching mechanism 50 is illustrated by causing the second cover member 64 to be in a transparent state in the scanner 1.

When the apparatus main body 2 is in the normal reading posture, as illustrated in FIG. 9, the transport motor 36 overlaps with a portion of the reading unit 40 in both the Y-axis direction and the Z-axis direction. Specifically, the transport motor 36 overlaps with the second reading unit 43 over a range of a length Z1 (mm) in the Z-axis direction. Further, the transport motor 36 overlaps with the first reading unit 42 over a range of a length Y1 (mm) in the Y-axis direction.

Note that when the apparatus main body 2 is in the booklet reading posture, as illustrated in FIG. 10, the transport motor 36 overlaps with the second reading unit 43 over a range of a length Z2 (mm) in the Z-axis direction, and does not overlap with the second reading unit 43 in the Y-axis direction.

Note that the transport motor 36 may overlap with a portion of the reading unit 40 in only one of the Z-axis direction and the X-axis direction.

In the normal reading posture, a center portion in the Z direction of the transport motor 36, which corresponds to a portion of the transport motor 36, and a portion thereof above the central portion are located above the reading unit 40 in the Z-axis direction. Note that a portion or all of the transport motor 36 may be located above the reading unit 40 regardless of the posture of the apparatus main body 2.

Further, in this embodiment, the entire transport motor 36 overlaps with a portion of the guide member 33 in all of the X-axis direction, the Y-axis direction, and the Z-axis direction. However, the entire transport motor 36 may overlap with a portion of the guide member 33 in one direction or two directions of the X-axis direction, the Y-axis direction, and the Z-axis direction. Further, the overlapping state between the transport motor 36 and the guide member 33 may not be a relationship between the entire transport motor 36 and a portion of the guide member 33, and may be a relationship between a portion of the transport motor 36 and a portion of the guide member 33.

Of an imaginary housing portion having a cuboid shape and capable of internally housing the switching mechanism 50, a region S1, in which the switching mechanism 50 is provided, is indicated by the outline of the housing portion having the smallest size.

When viewed along the B-axis direction in the negative B direction from a position in the positive B direction, the switching mechanism 50 overlaps with a portion of the reading path R2, over a range of a length A1 (mm), the reading path R2 being a portion of the transport path R.

Note that, when viewed from the B-axis direction, the switching mechanism 50 may overlap with a portion of the transport path R other than the reading path R2.

As illustrated in FIG. 11, the transport motor 36 overlaps with the first reading unit 42 over a range of a length X2 (mm) in the X-axis direction. Further, the transport motor 36 overlaps with a portion of the reading unit 40 in the X-axis direction, the Y-axis direction, and the Z-axis direction, as an example. An end portion in the positive X direction of the transport motor 36 overlaps with an end portion in the negative X direction of the first guide member 34 over the range of the length X2 in the X-axis direction.

A region of the document G in the X-axis direction, on which the reading is performed, is referred to as a reading region S2. The reading region S2 is smaller than the movable region S3 described above.

The end portion in the positive X direction of the transport motor 36 overlaps with a portion of the movable region S3 in the X-axis direction. The overlap amount between the transport motor 36 and the movable region S3 is the length X2 (mm), as an example.

Note that a portion of the transport motor 36 need not necessarily overlap with a portion of the movable region S3 in the X-axis direction.

As illustrated in FIG. 11, a portion of the transport motor 36 overlaps with a portion of the first guide member 34 in the Z-axis direction. The overlap amount between the transport motor 36 and the portion of the first guide member 34 is the length X2 (mm), as an example.

As illustrated in FIG. 13, a portion of the motor main body 36A of the transport motor 36 overlaps with the light source unit 42B in the X-axis direction. The overlap amount between the portion of the motor main body 36A and the light source unit 42B is a length X3 (mm), as an example.

The light source unit 42B is located on the outer side in the X-axis direction of the reading region S2 (FIG. 11) of the document G. In other words, as a result of the portion other than the reading region S2 overlapping with the portion of the motor main body 36A, the reading region S2 can be secured, and at the same time, the footprint of the scanner 1 can be reduced.

Note that a portion of the transport motor 36 may overlap with a portion of the light source unit 42B in the X-axis direction.

Figure 14:
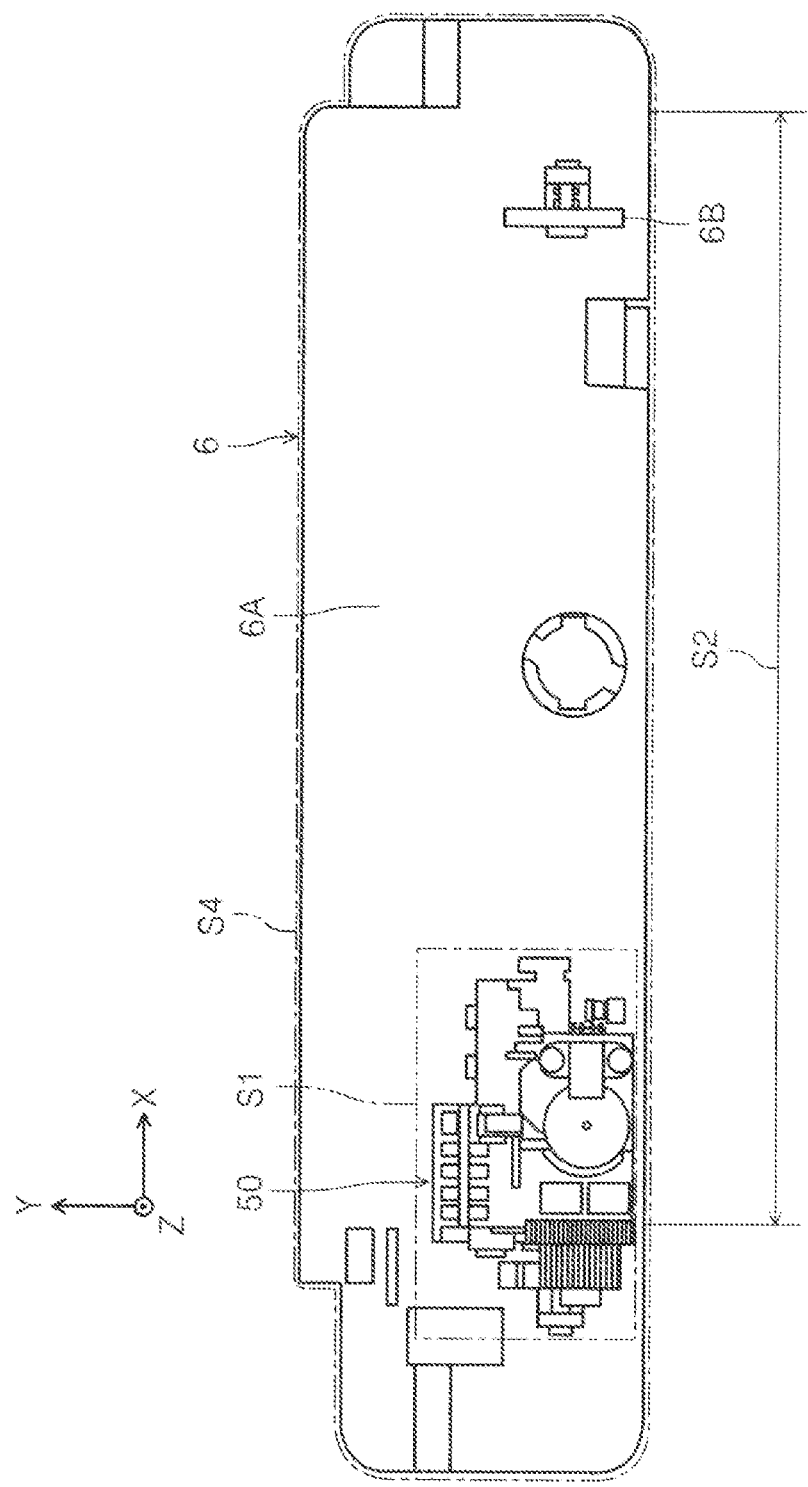
FIG. 14 is a plan view, as viewed from above, of a stand and the switching mechanism of the scanner in which the apparatus main body is in the normal reading posture.

As illustrated in FIG. 14, when viewed in the negative Z direction from a position in the positive Z direction with respect to the base plate portion 6A, the region S1 of the switching mechanism 50 is located inside the region S4 corresponding to the outline of the base plate portion 6A. In other words, the switching mechanism 50 is located inside the region S4 of the stand 6. Further, in the X-axis direction, a portion of the region S1 is located inside the reading region S2.

Note that, in FIG. 14, FIG. 15, FIG. 16, FIG. 17, and FIG. 18, the switching mechanism 50 and the apparatus main body 2 (FIG. 3) excluding the first reading unit 42 or the transport unit 20 are omitted.

Figure 15:
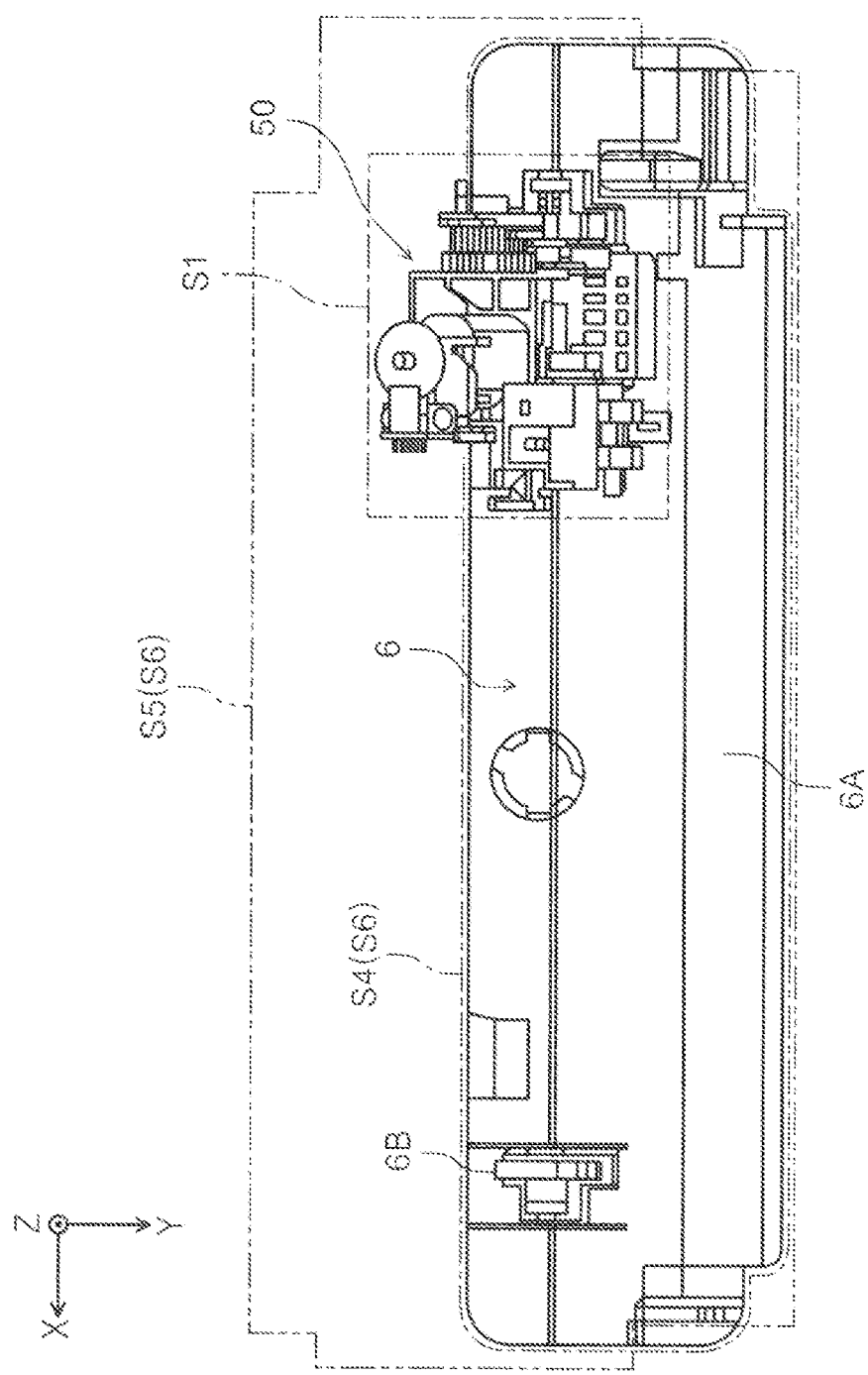
FIG. 15 is a plan view, as viewed from above, of the stand and the switching mechanism of the scanner in which the apparatus main body is in the booklet reading posture.

In FIG. 15, in the booklet reading posture, a region S5 corresponding to the outline of the apparatus main body 2 (FIG. 3) and the region S1 and the region S4 described above are illustrated. Note that a region obtained by combining the region S4 and the region S5 is referred to as a region S6.

When viewed in the negative Z direction from a position in the positive Z direction with respect to the base plate portion 6A, the region S1 is located inside the region S6.

Figure 16:
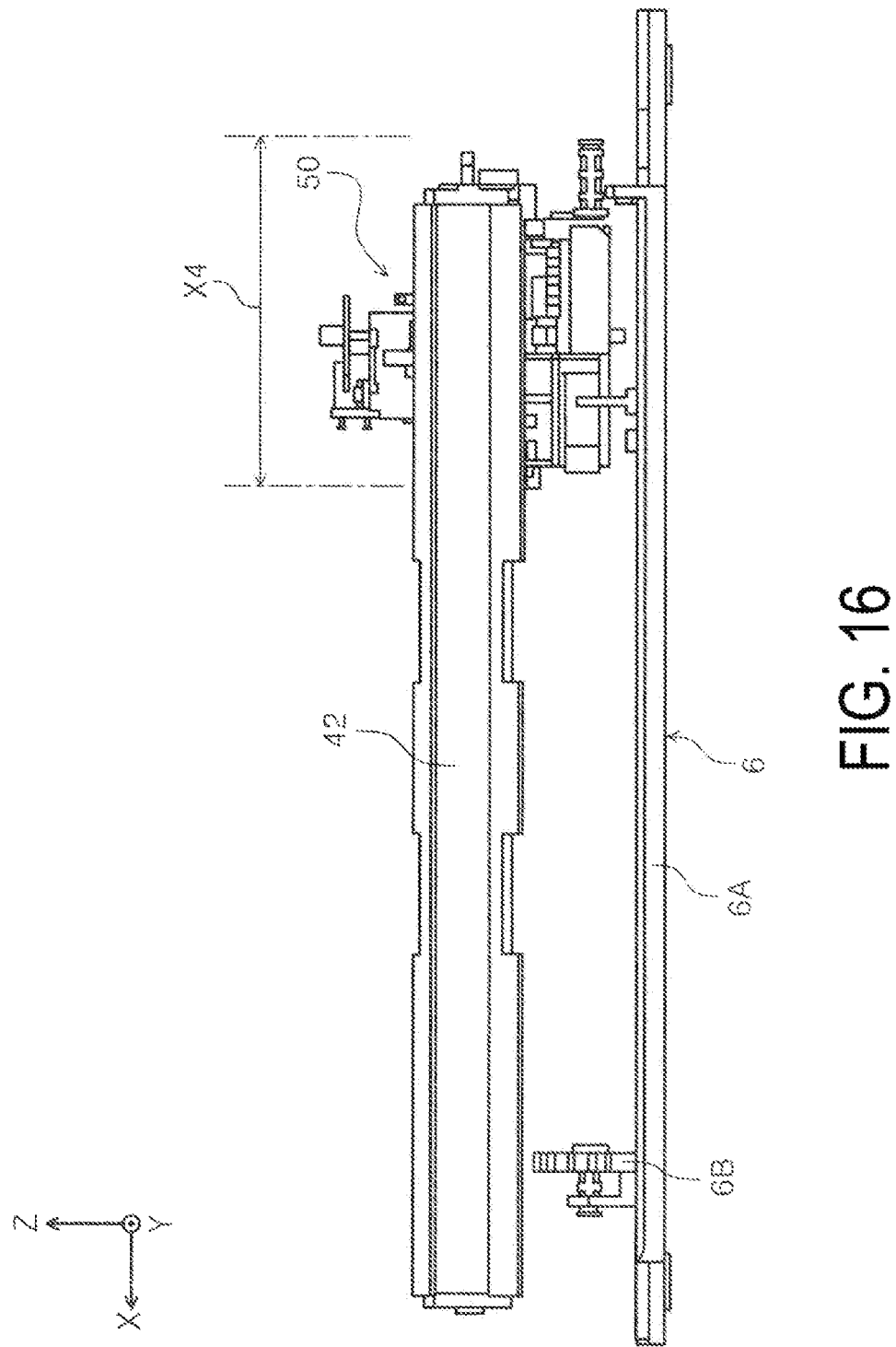
FIG. 16 is a front view, as viewed from the front, of the stand, the first reading unit, and the switching mechanism of the scanner in which the apparatus main body is in the normal reading posture.

As illustrated in FIG. 16, when viewed in the negative Y direction from a position in the positive Y direction with respect to the first reading unit 42, a portion of the switching mechanism 50 overlaps with a portion of the first reading unit 42 in the X-axis direction over a range of a length X4 (mm).

Figure 17:
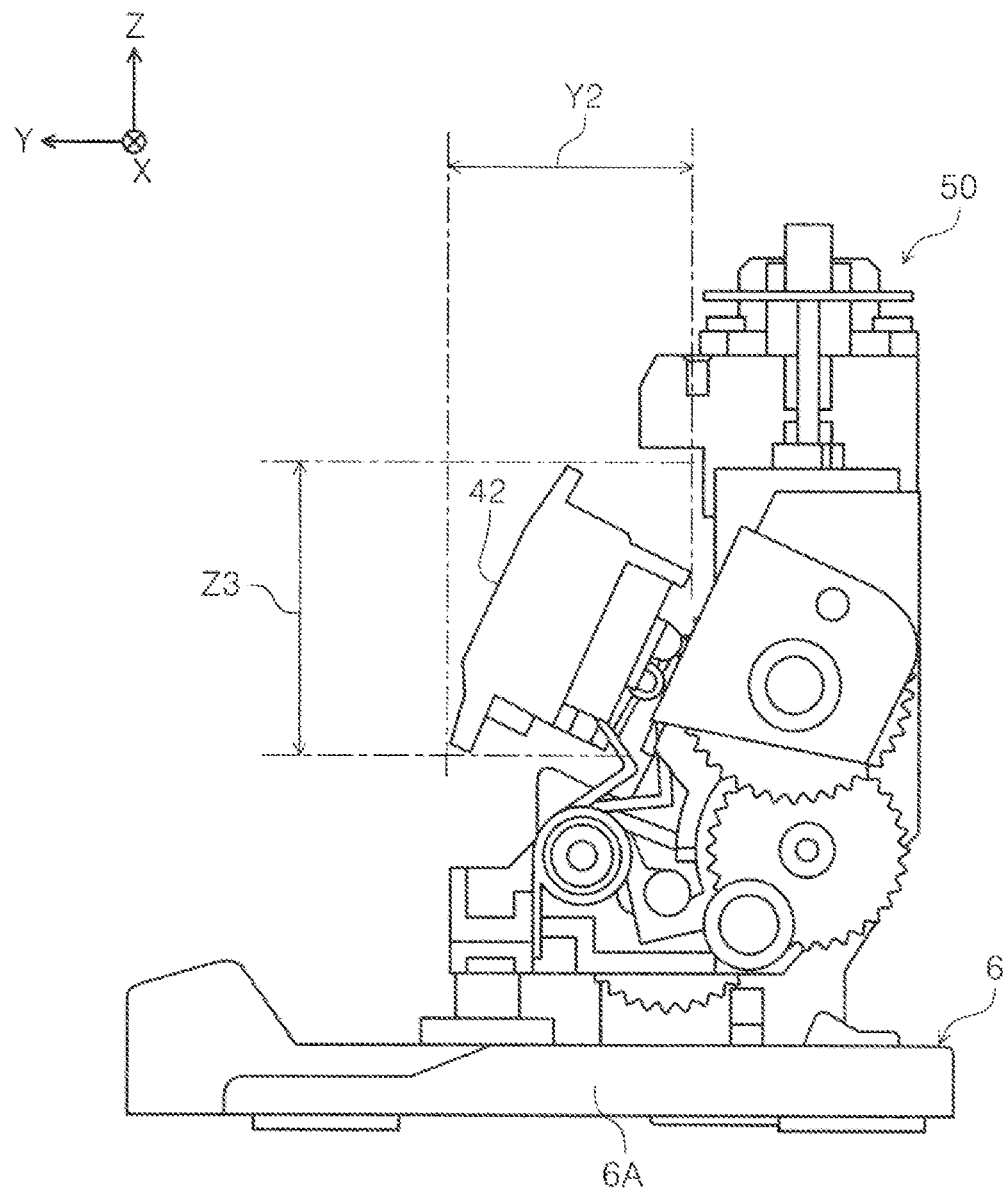
FIG. 17 is a side view, as viewed from the one side in the width direction, of the stand, the first reading unit, and the switching mechanism of the scanner in which the apparatus main body is in the normal reading posture.

As illustrated in FIG. 17, a portion of the switching mechanism 50 overlaps with the first reading unit 42 over a range of a length Y2 (mm) in the Y-axis direction. Another portion of the switching mechanism 50 overlaps with the first reading unit 42 over a range of a length Z3 (mm) in the Z-axis direction.

Note that, since the reading path R2 (FIG. 3) extends along the A-axis direction that is a diagonal direction intersecting the Z-axis direction, the first reading unit 42 is disposed in an inclined manner. Thus, when viewed from the X-axis direction, a triangular space is present at the back surface side of the apparatus main body 2 (FIG. 3) with respect to the first reading unit 42. However, as a result of the other portion of the apparatus main body 2 (FIG. 3) being located in this space, the space is filled. As a result, the footprint of the scanner 1 can be reduced.

Figure 18:
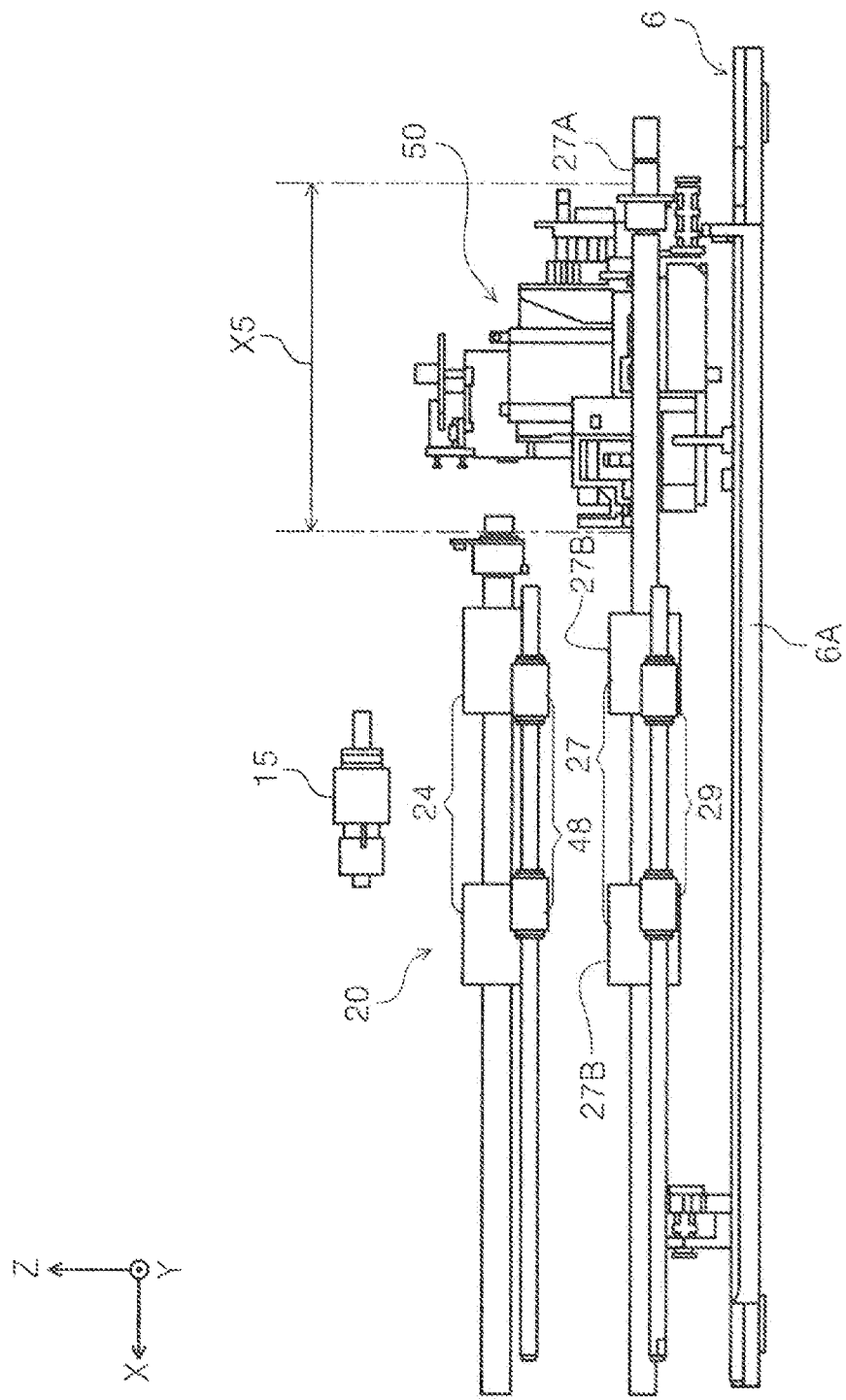
FIG. 18 is a front view, as viewed from the front, of the stand, each of rollers, and the switching mechanism of the scanner in which the apparatus main body is in the normal reading posture.

As illustrated in FIG. 18, the fourth roller 27 includes a shaft portion 27A extending in the X-axis direction and a roller main body portion 27B.

A portion of the switching mechanism 50 overlaps with a portion of the shaft portion 27A over a range of a length X5 (mm) in the X-axis direction. In other words, the portion of the switching mechanism 50 overlaps with a portion of the transport unit 20 in the X-axis direction.

Next, effects of the scanner 1 according to this embodiment will be described. Note that each of the configurations of the scanner 1 will be described with reference to each of the configurations and reference signs illustrated in FIG. 1 to FIG. 18, and individual drawing numbers will be omitted in the description.

According to the scanner 1, when the transport path R extends along the intersecting direction intersecting the installation surface D, the width in the X-axis direction of a space occupied by the scanner 1 is caused to be narrower than that obtained when the transport path R extends along the installation surface D. Then, when the transport path R extends along the intersecting direction, the switching motor 52 is located inside the apparatus main body 2 on the lower side of the transport path R in the Z-axis direction.

In other words, in a state in which the width in the X-axis direction of the space occupied by the scanner 1 is narrow, the switching motor 52 is disposed in a free region inside the apparatus main body 2 on the lower side of the transport path R in the Z-axis direction. Thus, the footprint of the scanner 1 can be reduced.

According to the scanner 1, the rotary shaft 53 is disposed so as to include a Z-axis direction component, and thus the switching motor 52 is brought into a state of standing up with respect to the installation surface D. Thus, the footprint of the scanner 1 can be reduced.

According to the scanner 1, the switching mechanism 50 overlaps with a portion of the reading path R2, and thus the footprint of the scanner 1 can be reduced compared to a configuration in which the switching mechanism 50 does not overlap with the portion of the reading path R2.

According to the scanner 1, the guide member 33 for guiding the document G and the transport motor 36 are not required to be disposed offset from each other in the Z-axis direction, and thus the apparatus height of the scanner 1 can be reduced.

According to the scanner 1, the guide member 33 for guiding the document G and the transport motor 36 are not required to be disposed offset from each other in the X-axis direction, and thus the footprint of the scanner 1 can be reduced.

According to the scanner 1, the transport motor 36 overlaps with a portion of the reading unit 40 in two directions of the Z-axis direction and the X-axis direction, and thus the footprint of the scanner 1 can be reduced.

According to the scanner 1, heat generated during the operation of the transport motor 36 travels upward in the Z-axis direction. As a result, the heat of the transport motor 36 is less likely to be transferred to the reading unit 40, and thus the reading unit 40 is less likely to be distorted. Therefore, a deterioration in the reading accuracy of the document G can be suppressed.

According to the scanner 1, a portion of the transport motor 36 overlaps with the light source unit 42B, and thus the footprint of the scanner 1 can be reduced.

According to the scanner 1, a portion of the transport motor 36 overlaps with a portion of the movable region S3 of the edge guides 12 and 13 in the X-axis direction, and thus the footprint of the scanner 1 can be reduced.

According to the scanner 1, in the X-axis direction, the width of the second cover member 64 on the back surface side is narrower than the width of the first cover member 62 located further to the front surface side than the second cover member 64, and thus the second cover member 64 on the back surface side is hidden when viewed from the front surface side. As a result, the design of the scanner 1 when viewed from the front surface side is improved.

According to the scanner 1, a portion of the apparatus main body 2 in which the switching motor 52 is housed is disposed at a position that is not visible from the front surface side, and thus a deterioration in the design of the scanner 1 when viewed from the front surface side can be suppressed.

Although the scanner 1 according to the embodiment of the present disclosure basically has the configurations described above, of course, it is possible to partially change or omit the configurations, or combine the configurations within a range that does not deviate from the gist of the present disclosure.

For example, in the scanner 1, the transport path R need not necessarily include the inversion unit 28. Further, the transport motor 36 and the switching motor 52 may be constituted by one motor. In this case, a transmission path of the driving force may be switched by switching a plurality of toothed gear trains.

The transport motor 36 and the switching motor 52 may be provided in the positive X direction with respect to the center in the X-axis direction of the apparatus main body 2.

The switching mechanism 50 is not limited to the mechanism in which the apparatus main body 2 is rotated using the motor, and may be, for example, a mechanism in which the posture of the apparatus main body 2 is switched using a solenoid and a spring.

What is claimed is:

1. An image reading apparatus, comprising:
   an apparatus main body including:
      a transport unit configured to transport a document along a transport path, and
      a reading unit configured to read an image on the document;
   a support portion configured to support the apparatus main body; and
   a switching mechanism configured to switch a posture of the apparatus main body to at least two postures with respect to the support portion, wherein
      the switching mechanism includes a switching motor configured to impart, to the apparatus main body, a driving force to switch the posture of the apparatus main body, and
      the switching motor is located, on a lower side of the transport path in a vertical direction, inside the apparatus main body.

2. The image reading apparatus according to claim 1, wherein
   the switching motor includes a rotary shaft, and
   an imaginary line obtained by extending a center line of the rotary shaft intersects with an installation surface on which the support portion is installed.

3. The image reading apparatus according to claim 1, wherein
   the transport path includes a reading path facing the reading unit, and
   the switching mechanism overlaps with a portion of the reading path when viewed from a facing direction in which the reading unit and the reading path face each other.

4. The image reading apparatus according to claim 1, wherein
   the transport unit includes
      a transport member configured to transport the document,
      a guide member configured to guide the document, and
      a transport drive source configured to rotationally drive the transport member, and at least a portion of the transport drive source overlaps with at least a portion of the guide member in an apparatus height direction intersecting a transport direction of the document.

5. The image reading apparatus according to claim 4, wherein at least a portion of the transport drive source overlaps with a portion of the guide member in an apparatus width direction intersecting the transport direction.

6. The image reading apparatus according to claim 4, wherein the transport drive source overlaps with a portion of the reading unit in both the apparatus height direction, and an apparatus width direction intersecting the transport direction.

7. The image reading apparatus according to claim 6, wherein in at least one of the at least two postures, at least a portion of the transport drive source is located above the reading unit in the vertical direction.

8. The image reading apparatus according to claim 6, wherein
the reading unit includes a light source unit configured to irradiate the document with light, and
at least a portion of the transport drive source overlaps with the light source unit in the apparatus width direction.

9. The image reading apparatus according to claim 4, wherein
the apparatus main body includes
a placement portion at which the document before being transported is placed, and
an edge guide provided at the placement portion and configured to move in an apparatus width direction intersecting the transport direction of the document and to align an end portion in the apparatus width direction of the document, and
a portion of the transport drive source overlaps with a portion of a movable region of the edge guide in the apparatus width direction.

10. The image reading apparatus according to claim 1, wherein
the apparatus main body includes
a first cover member constituting a side portion of the apparatus main body in an apparatus width direction intersecting a transport direction of the document, and
a second cover member constituting a side portion of the apparatus main body at a back surface side of the apparatus main body, the second cover member being further away from a placement portion at which the document is placed than the first cover member, and
a second length in the apparatus width direction of the second cover member is shorter than a first length in the apparatus width direction of the first cover member.

11. The image reading apparatus according to claim 10, wherein the second cover member overlaps with the switching motor in the apparatus width direction.

* * * * *